United States Patent
Jang et al.

(10) Patent No.: US 12,113,975 B2
(45) Date of Patent: Oct. 8, 2024

(54) IMAGE ENCODING/DECODING METHOD AND APPARATUS FOR PERFORMING PREDICTION ON BASIS OF RECONFIGURED PREDICTION MODE TYPE OF LEAF NODE, AND BITSTREAM TRANSMISSION METHOD

(71) Applicant: LG Electronics Inc., Seoul (KR)

(72) Inventors: Hyeong Moon Jang, Seoul (KR); Jung Hak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 17/789,939

(22) PCT Filed: Dec. 31, 2020

(86) PCT No.: PCT/KR2020/019287
§ 371 (c)(1),
(2) Date: Jun. 29, 2022

(87) PCT Pub. No.: WO2021/137577
PCT Pub. Date: Jul. 8, 2021

(65) Prior Publication Data
US 2023/0049298 A1 Feb. 16, 2023

Related U.S. Application Data

(60) Provisional application No. 62/956,093, filed on Dec. 31, 2019, provisional application No. 62/959,943, (Continued)

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11); *H04N 19/96* (2014.11)

(58) Field of Classification Search
CPC .. H04N 19/119; H04N 19/157; H04N 19/159; H04N 19/176; H04N 19/96
(Continued)

(56) References Cited

U.S. PATENT DOCUMENTS 11,695,917 B2 * 7/2023 Yoo .................. H04N 19/12
375/240.12
2013/0142259 A1 * 6/2013 Lim .................. H04N 19/64
375/240.12

(Continued)

FOREIGN PATENT DOCUMENTS

KR 101505755 3/2015
KR 20180046876 5/2018
(Continued)

OTHER PUBLICATIONS

Bross et al., "Versatile Video Coding (Draft 7)", Oct. 1-11, 2019, JVET-P2001-vE, pp. 1-465. (Year: 2019).*
(Continued)

*Primary Examiner* — Kathleen M Walsh
(74) *Attorney, Agent, or Firm* — Fish & Richardson P.C.

(57) ABSTRACT

An image encoding/decoding method and apparatus are provided. An image decoding method performed by an image decoding apparatus comprises obtaining a current block corresponding to a leaf node of a split tree structure based on a predetermined prediction mode type, resetting a prediction mode type of the current block, obtaining prediction mode information of the current block based on the reset prediction mode type, and generating a prediction block of the current block based on the prediction mode information. The resetting the prediction mode type of the current block may be performed based on at least one of a slice type or size of the current block.

15 Claims, 17 Drawing Sheets

Related U.S. Application Data filed on Jan. 11, 2020, provisional application No. 62/980,442, filed on Feb. 24, 2020.

(51) Int. Cl.
 *H04N 19/176* (2014.01)
 *H04N 19/96* (2014.01)

(58) Field of Classification Search
 USPC .................................................... 375/240.02
 See application file for complete search history.

(56) References Cited

U.S. PATENT DOCUMENTS

| | | | | |
|---|---|---|---|---|
| 2021/0092405 | A1* | 3/2021 | Biatek | H04N 19/70 |
| 2022/0210437 | A1* | 6/2022 | Xu | H04N 19/186 |
| 2022/0248009 | A1* | 8/2022 | Xu | H04N 19/11 |
| 2023/0127932 | A1* | 4/2023 | Zhu | H04N 19/105 |
| | | | | 375/240.02 |

FOREIGN PATENT DOCUMENTS

| | | | |
|---|---|---|---|
| KR | 20190107581 | 9/2019 | |
| WO | WO2019098464 | 5/2019 | |
| WO | WO-2021046509 A1 * | 3/2021 | ........... H04N 19/103 |

OTHER PUBLICATIONS

Bross et al., "Versatile Video Coding (Draft 7)," JVET-P2001-vE, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 489 pages.

* cited by examiner

FIG. 4
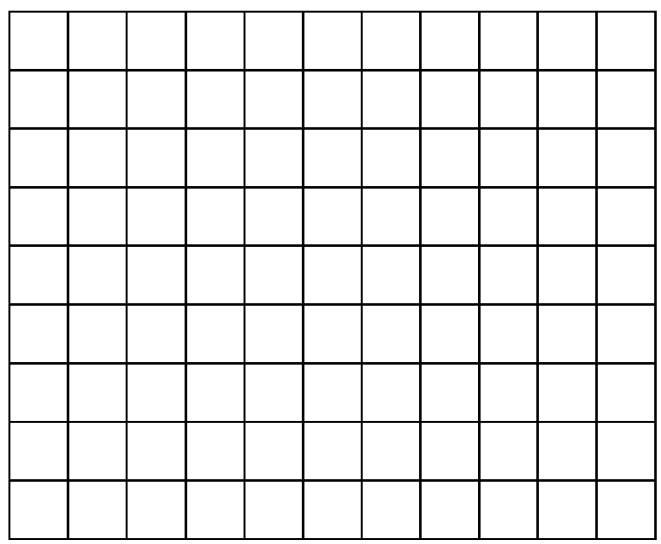
FIG. 5
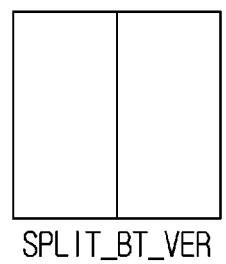  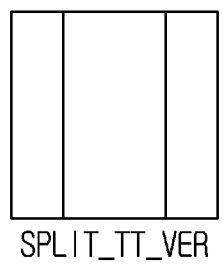 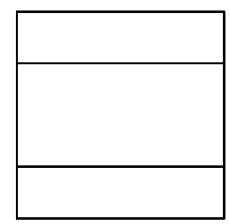
SPLIT_BT_VER   SPLIT_BT_HOR   SPLIT_TT_VER   SPLIT_TT_HOR

FIG. 14

| coding_unit( x0, y0, cbWidth, cbHeight, cqtDepth, treeType, modeType ) { | Descriptor |
|---|---|
| chType = treeType = = DUAL_TREE_CHROMA ? 1 : 0 | |
| if( slice_type != I \|\| sps_ibc_enabled_flag ) { | |
|   if( treeType != DUAL_TREE_CHROMA &&<br>    ( ( !( cbWidth = = 4 && cbHeight = = 4 ) && modeType != MODE_TYPE_INTRA )<br>    \|\| ( sps_ibc_enabled_flag && cbWidth <= 64 && cbHeight <= 64 ) ) ) | |
|     cu_skip_flag[ x0 ][ y0 ] | ae(v) |
|   if( cu_skip_flag[ x0 ][ y0 ] == 0 && slice_type != I<br>    && !( cbWidth == 4 && cbHeight == 4 ) && modeType == MODE_TYPE_ALL ) | |
|     pred_mode_flag | ae(v) |
|   if( ( ( slice_type == I && cu_skip_flag[ x0 ][ y0 ] ==0 ) \|\|<br>    ( slice_type != I && ( CuPredMode[ chType ][ x0 ][ y0 ] != MODE_INTRA \|\|<br>    ( ( ( cbWidth == 4 && cbHeight == 4 ) \|\| modeType == MODE_TYPE_INTRA )<br>    && cu_skip_flag[ x0 ][ y0 ] == 0 ) ) ) ) &&<br>    cbWidth <= 64 && cbHeight <=64 && modeType != MODE_TYPE_INTER &&<br>    sps_ibc_enabled_flag && treeType != DUAL_TREE_CHROMA ) | |
|     pred_mode_ibc_flag | ae(v) |
| } | |
| if( CuPredMode[ chType ][ x0 ][ y0 ] == MODE_INTRA && sps_palette_enabled_flag &&<br>  cbWidth <= 64 && cbHeight <= 64 && cu_skip_flag[ x0 ][ y0 ] == 0 &&<br>  modeType != MODE_TYPE_INTER ) | |
|     pred_mode_plt_flag | ae(v) |
| } | |

1410 → if( slice_type != I ... )
1420 → if( treeType != DUAL_TREE_CHROMA ... )
1430 → if( cu_skip_flag ... )
1440 → if( ( ( slice_type == I ... ) )
1450 → if( CuPredMode ... )

FIG. 16

| coding_unit( x0, y0, cbWidth, cbHeight, cqtDepth, treeType, modeType ) { | Descriptor |
|---|---|
| chType = treeType == DUAL_TREE_CHROMA ? 1 : 0 | |
| 1610 — modeType = (cbWidth == 4 && cbHeight == 4) ? MODE_TYPE_INTRA : modeType | |
| if( slice_type != I \|\| sps_ibc_enabled_flag ) { | |
| 1620 — if( treeType != DUAL_TREE_CHROMA && <br> ( ( modeType != MODE_TYPE_INTRA ) <br> \|\| ( sps_ibc_enabled_flag && cbWidth <= 64 && cbHeight <= 64 ) ) ) | |
| cu_skip_flag[ x0 ][ y0 ] | ae(v) |
| 1630 — if( cu_skip_flag[ x0 ][ y0 ] == 0 && slice_type != I <br> && modeType == MODE_TYPE_ALL ) | |
| pred_mode_flag | ae(v) |
| 1640 — if( ( ( slice_type == I && cu_skip_flag[ x0 ][ y0 ] == 0 ) \|\| <br> ( slice_type != I && ( CuPredMode[ chType ][ x0 ][ y0 ] != MODE_INTRA \|\| <br> ( ( modeType == MODE_TYPE_INTRA ) <br> && cu_skip_flag[ x0 ][ y0 ] == 0 ) ) ) ) && <br> cbWidth <= 64 && cbHeight <= 64 && modeType != MODE_TYPE_INTER && <br> sps_ibc_enabled_flag && treeType != DUAL_TREE_CHROMA ) | |
| pred_mode_ibc_flag | ae(v) |
| } | |
| if( CuPredMode[ chType ][ x0 ][ y0 ] == MODE_INTRA && sps_palette_enabled_flag && <br> cbWidth <= 64 && cbHeight <= 64 && cu_skip_flag[ x0 ][ y0 ] == 0 && <br> modeType != MODE_TYPE_INTER ) | |
| pred_mode_plt_flag | ae(v) |
| } | |

FIG. 17

| coding_unit( x0, y0, cbWidth, cbHeight, cqtDepth, treeType, modeType ) { | Descriptor |
|---|---|
| chType = treeType == DUAL_TREE_CHROMA ? 1 : 0 | |
| 1710 — modeType = (slice_type == I \|\| (cbWidth == 4 && cbHeight == 4)) ? MODE_TYPE_INTRA : modeType | |
| 1720 — if(treeType != DUAL_TREE_CHROMA && (modeType != MODE_TYPE_INTRA \|\| ( sps_ibc_enabled_flag && Max(cbWidth,cbHeight) <= 64 ) ) ) | |
| cu_skip_flag[ x0 ][ y0 ] | ae(v) |
| 1730 — if( modeType == MODE_TYPE_ALL && cu_skip_flag[ x0 ][ y0 ] == 0) | |
| pred_mode_flag | ae(v) |
| 1740 — if( sps_ibc_enabled_flag && treeType != DUAL_TREE_CHROMA && Max(cbWidth, cbHeight) <= 64 && (( modeType != MODE_TYPE_INTER && cuPredMode[chType][x0][y0] == MODE_INTER) \|\| ( modeType == MODE_TYPE_INTRA && cu_skip_flag[x0][y0] == 0 ) ) ) | |
| pred_mode_ibc_flag | ae(v) |
| 1750 — if( sps_palette_enabled_flag && cuPredMode[chType][x0][y0] == MODE_INTRA && Max(cbWidth, cbHeight) <= 64) | |
| pred_mode_plt_flag | ae(v) |

FIG. 18

| coding_unit( x0, y0, cbWidth, cbHeight, cqtDepth, treeType, modeType ) { | Descriptor |
|---|---|
|   chType = treeType == DUAL_TREE_CHROMA ? 1 : 0 | |
| 1810 — modeType = slice_type == I ? MODE_TYPE_INTRA : modeType | |
| 1820 — if( slice_type != I \|\| sps_ibc_enabled_flag ) { | |
| 1830 —   if( treeType != DUAL_TREE_CHROMA && <br>    ( ( !( cbWidth == 4 && cbHeight == 4 ) && modeType != MODE_TYPE_INTRA ) <br>    \|\| ( sps_ibc_enabled_flag && cbWidth <= 64 && cbHeight <= 64 ) ) ) | |
|     cu_skip_flag[ x0 ][ y0 ] | ae(v) |
|   if( cu_skip_flag[ x0 ][ y0 ] == 0 && slice_type != I <br>    && !( cbWidth == 4 && cbHeight == 4 ) && modeType == MODE_TYPE_ALL ) | |
|     pred_mode_flag | ae(v) |
|   if( ( ( slice_type == I && cu_skip_flag[ x0 ][ y0 ] == 0 ) \|\| <br>    ( slice_type != I && ( CuPredMode[ chType ][ x0 ][ y0 ] != MODE_INTRA \|\| <br>    ( ( ( cbWidth == 4 && cbHeight == 4 ) \|\| modeType == MODE_TYPE_INTRA ) <br>    && cu_skip_flag[ x0 ][ y0 ] == 0 ) ) ) ) && <br>    cbWidth <= 64 && cbHeight <= 64 && modeType != MODE_TYPE_INTER && <br>    sps_ibc_enabled_flag && treeType != DUAL_TREE_CHROMA ) | |
|     pred_mode_ibc_flag | ae(v) |
| } | |
| if( CuPredMode[ chType ][ x0 ][ y0 ] == MODE_INTRA && sps_palette_enabled_flag && <br>  cbWidth <= 64 && cbHeight <= 64 && cu_skip_flag[ x0 ][ y0 ] == 0 && <br>  modeType != MODE_TYPE_INTER ) | |
|     pred_mode_plt_flag | ae(v) |
| } | |

FIG. 19

| coding_unit( x0, y0, cbWidth, cbHeight, cqtDepth, treeType, modeType ) { | Descriptor |
|---|---|
|   chType = treeType == DUAL_TREE_CHROMA ? 1 : 0 | |
| 1910 — if( slice_type != I \|\| sps_ibc_enabled_flag ) { | |
| 1920 —   if( treeType != DUAL_TREE_CHROMA && <br>    ( ( !( cbWidth == 4 && cbHeight == 4 ) && modeType != MODE_TYPE_INTRA <br>    && slice_type != I ) <br>    \|\| ( sps_ibc_enabled_flag && cbWidth <= 64 && cbHeight <= 64 ) ) ) | |
|     cu_skip_flag[ x0 ][ y0 ] | ae(v) |
|   if( cu_skip_flag[ x0 ][ y0 ] == 0 && slice_type != I <br>    && !( cbWidth == 4 && cbHeight == 4 ) && modeType == MODE_TYPE_ALL ) | |
|     pred_mode_flag | ae(v) |
|   if( ( ( slice_type == I && cu_skip_flag[ x0 ][ y0 ] == 0 ) \|\| <br>    ( slice_type != I && ( CuPredMode[ chType ][ x0 ][ y0 ] != MODE_INTRA \|\| <br>    ( ( ( cbWidth == 4 && cbHeight == 4 ) \|\| modeType == MODE_TYPE_INTRA ) <br>    && cu_skip_flag[ x0 ][ y0 ] == 0 ) ) ) ) && <br>    cbWidth <= 64 && cbHeight <= 64 && modeType != MODE_TYPE_INTER && <br>    sps_ibc_enabled_flag && treeType != DUAL_TREE_CHROMA ) | |
|     pred_mode_ibc_flag | ae(v) |
| } | |
| if( CuPredMode[ chType ][ x0 ][ y0 ] == MODE_INTRA && sps_palette_enabled_flag && <br>  cbWidth <= 64 && cbHeight <= 64 && cu_skip_flag[ x0 ][ y0 ] == 0 && <br>  modeType != MODE_TYPE_INTER ) | |
|     pred_mode_plt_flag | ae(v) |
| } | |

IMAGE ENCODING/DECODING METHOD AND APPARATUS FOR PERFORMING PREDICTION ON BASIS OF RECONFIGURED PREDICTION MODE TYPE OF LEAF NODE, AND BITSTREAM TRANSMISSION METHOD

CROSS-REFERENCE TO RELATED APPLICATIONS

This application is a National Stage application under 35 U.S.C. § 371 of International Application No. PCT/KR2020/019287, filed on Dec. 31, 2020, which claims the benefit of U.S. Provisional Application No. 62/956,093, filed on Dec. 31, 2019, U.S. Provisional Application No. 62/959,943, filed on Jan. 11, 2020 and U.S. Provisional Application No. 62/980,442, filed on Feb. 24, 2020. The disclosures of the prior applications are incorporated by reference in their entirety.

TECHNICAL FIELD

The present disclosure relates to an image encoding/decoding method and apparatus and a method of transmitting a bitstream, and, more particularly, to an image encoding/decoding method and apparatus for performing prediction based on a reset prediction mode type of a leaf node, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for resetting a prediction mode type based on at least one of a slice type or size of a current block.

Another object of the present disclosure is to provide an image encoding/decoding method and apparatus for encoding/decoding prediction mode information based on an reset prediction mode type of a current block.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

TECHNICAL SOLUTION

An image decoding method performed by an image decoding apparatus according to an aspect of the present disclosure may comprise may comprise obtaining a current block corresponding to a leaf node of a split tree structure based on a predetermined prediction mode type, resetting a prediction mode type of the current block, obtaining prediction mode information of the current block based on the reset prediction mode type, and generating a prediction block of the current block based on the prediction mode information. The resetting the prediction mode type of the current block may be performed based on at least one of a slice type or size of the current block.

An image decoding apparatus according to another aspect of the present disclosure may comprise a memory and at least one processor. The at least one processor may obtain a current block corresponding to a leaf node of a split tree structure based on a predetermined prediction mode type, reset a prediction mode type of the current block, obtain prediction mode information of the current block based on the reset prediction mode type, and generate a prediction block of the current block based on the prediction mode information. The prediction mode type of the current block may be reset based on at least one of a slice type or size of the current block.

An image encoding method performed by an image encoding apparatus according to another aspect of the present disclosure may comprise obtaining a current block corresponding to a leaf node of a split tree structure based on a predetermined prediction mode type, resetting a prediction mode type of the current block, and encoding prediction mode information of the current block based on the reset prediction mode type. The resetting the prediction mode type of the current block may be performed based on at least one of a slice type or size of the current block.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

ADVANTAGEOUS EFFECTS

According to the present disclosure, it is possible to provide an image encoding/decoding method and apparatus with improved encoding/decoding efficiency.

According to the present disclosure, it is possible to provide an image encoding/decoding method and apparatus for resetting a prediction mode type based on at least one of a slice type or size of a current block.

According to the present disclosure, it is possible to provide an image encoding/decoding method and apparatus for encoding/decoding prediction mode information based on an reset prediction mode type of a current block.

According to the present disclosure, it is possible to provide an image encoding/decoding method and apparatus for limiting signaling of prediction mode information of a skip mode when an reset prediction mode type of a current block is an intra type.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view illustrating a partitioning structure of an image according to an embodiment.

FIG. 5 is a view showing an embodiment of a partitioning type of a block according to a multi-type tree structure.

FIG. 14 is a view illustrating an example of coding_unit syntax including prediction mode information

FIGS. 16 to 19 are views illustrating coding_unit syntax according to an embodiment of the present disclosure.

MODE FOR INVENTION

Figure 1:
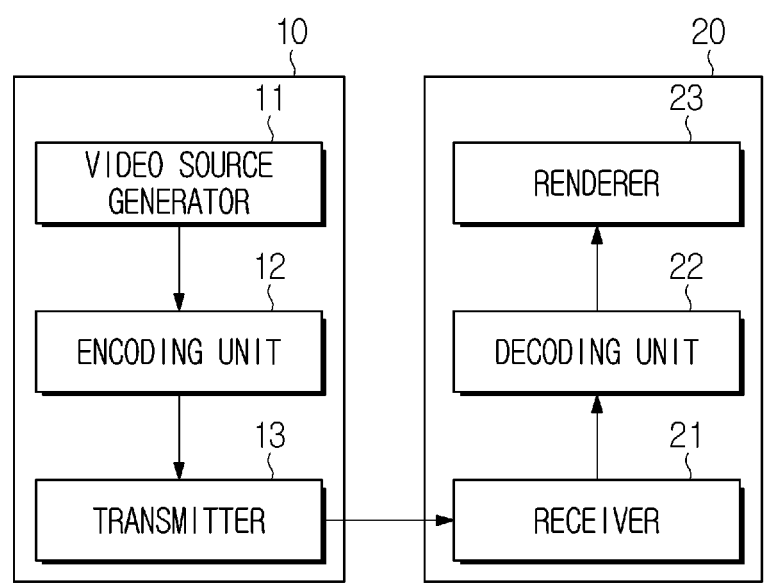
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in an embodiment, and similarly, a second component in one embodiment may be referred to as a first component in an embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The chroma component block of the current block may be expressed by including an explicit description of a luma component block, such as "luma block" or "current luma block". In addition, the chroma component block of the current block may be explicitly expressed by including an explicit description of the chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system, to which an embodiment of the present disclosure is applicable.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
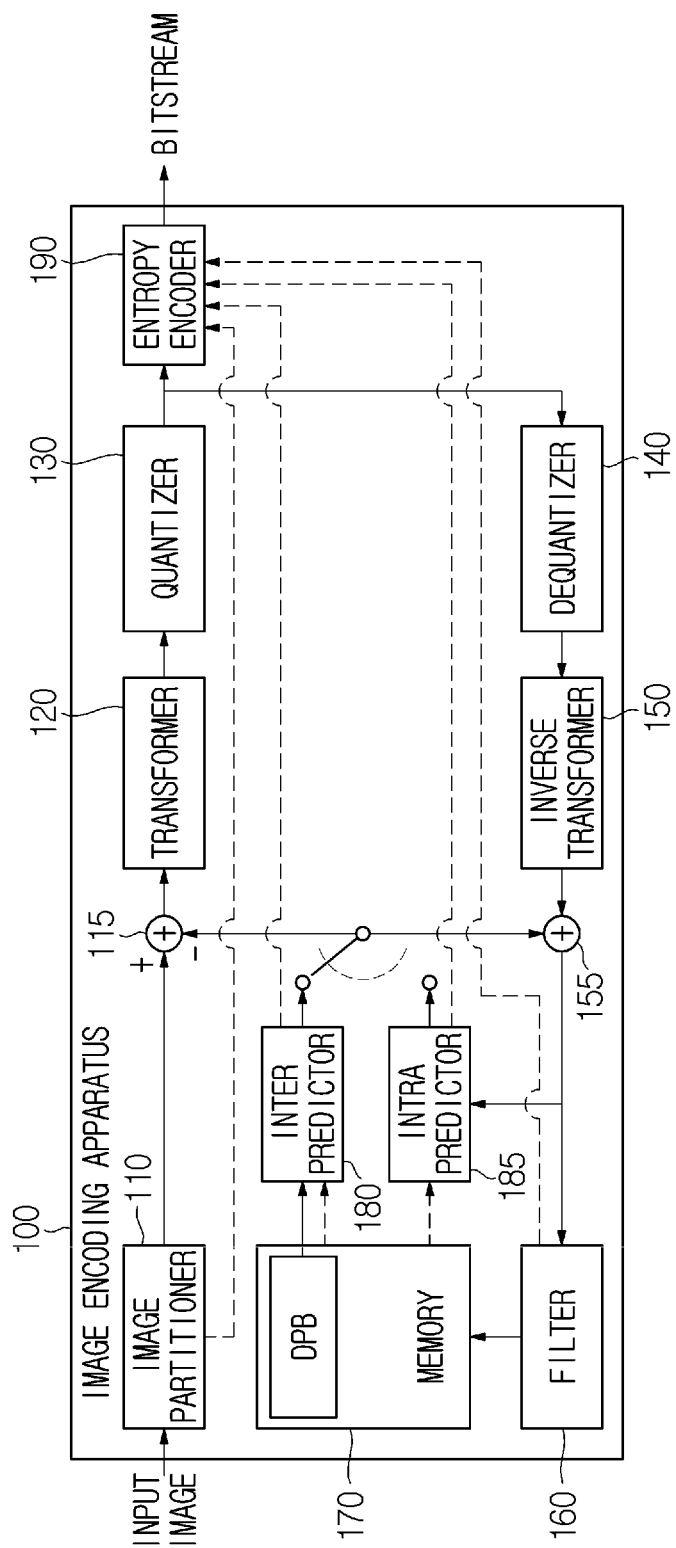
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied for the current block by using a prediction mode applied for a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied for square pixel blocks having the same size or may be applied for blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have been previously reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
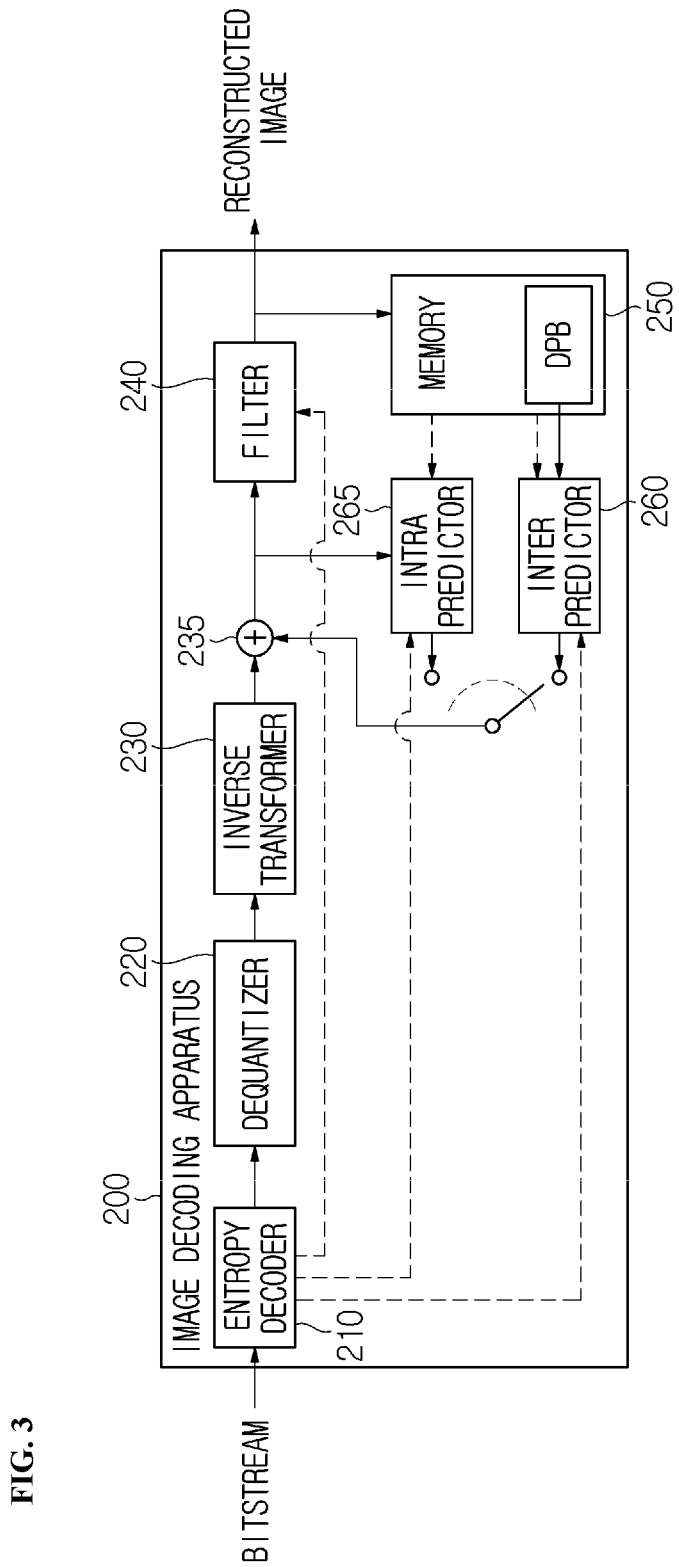
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied for the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied for the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have been previously reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied for the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding. A CU size and a TU size may be the same or a plurality of TUs may be present in a CU area. Meanwhile, the CU size may generally represent a luma component (sample) CB size. The TU size may generally represent a luma component (sample) TB size. A chroma component (sample) CB or TB size may be derived based on a luma component (sample) CB or TB size according to a component ratio according to a chroma format (color format, e.g., 4:4:4, 4:2:2, 4:2:0, etc.) of a picture/image. The TU size may be derived based on maxTbSize specifying an available maximum TB size. For example, when the CU size is greater than maxTb Size, a plurality of TUs (TBs) of maxTb Size may be derived from the CU and transform/inverse transform may be performed in units TUs (TBs). In addition, for example, when applying intra prediction, an intra prediction mode/type may be derived in units of CUs (or CBs), and a neighboring reference sample derivation and prediction sample generation procedure may be performed in units TUs (or TBs). In this case, one or a plurality of TUs (or TBs) may be present in one CU (or CB) area and, in this case, the plurality of TUs (or TBs) may share the same intra prediction mode/type.

In addition, in image encoding and decoding according to the present disclosure, an image processing unit may have a hierarchical structure. For example, one picture may be partitioned into one or more tiles or tile groups. One tile group may include one or more tiles. One tile may include one or more CTUs. The CTU may be partitioned into one or more CUs, as described above. The tile may consist of a rectangular region including CTUs assembled in a specific row and a specific column in a picture. The tile group may include an integer number of tiles according to tile-raster scan. A tile group header may signal information/parameters applicable to a corresponding tile group. When an encoding/decoding apparatus has a multi-core processor, an encoding/decoding procedure for the tile or tile group may be performed in parallel. Here, the tile group may have one of tile group types including an intra (I) tile group, a predictive (P) tile group and a bi-predictive (B) tile group. For blocks in the I tile group, inter prediction may not be used and only intra prediction may be used for prediction. Of course, even in this case, an original sample value may be coded and signalled without prediction. For blocks in the P tile group, intra prediction or inter prediction may be used, and only uni-prediction may be used when inter prediction. Meanwhile, for blocks in the B tile group, intra prediction or inter prediction may be used, and up to bi prediction may be used when inter prediction is used.

In an encoding apparatus, a tile/tile group, a slice, and a maximum and minimum coding unit size may be determined according to the characteristics (e.g., resolution) of an image and in consideration of coding efficiency or parallel processing and information thereon or information capable of deriving the same may be included in a bitstream.

In a decoding apparatus, information specifying a slice of a current picture, a tile/tile group or a CTU in a tile is partitioned into a plurality of coding units may be obtained. When such information is obtained (transmitted) only under specific conditions, efficiency may increase.

The slice header or the tile group header (tile group header syntax) may include information/parameters commonly applicable to the slice or tile group. APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to the entire video. In the present disclosure, higher level syntax may include at least one of the APS syntax, the PPS syntax, the SPS syntax or the VPS syntax.

In addition, for example, information on partitioning and construction of the tile/tile group may be constructed at an encoding stage through the higher level syntax and transmitted to a decoding apparatus in the form of a bitstream.

Partitioning Structure

Pictures may be partitioned into a sequence of coding tree units (CTUs). The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples. FIG. 4 shows an example in which a picture is partitioned into CTUs.

A maximum allowable size of a CTU for coding and prediction may be different from that of a CTU for transform. For example, even when a maximum size of a luma block in the CTU for transform is 64×64, a maximum size of a luma block for the CTU for coding and prediction may be 128×128.

In addition, a picture may be partitioned into one or more tile rows and one or more tile columns. A tile may be a sequence of CTUs covering a rectangular region in a picture.

A tile may be partitioned into one or more bricks, and each brick may consist of a plurality of CTU rows in a tile. In the present disclosure, a tile which is not partitioned into a plurality of bricks may be referred to as a brick.

A slice may include a plurality of tiles in a picture or a plurality of bricks in a tile. Two modes of a slice may be supported. One may be a raster scan slice mode and the other may be a rectangular slice mode.

In the raster slice mode, a slice may include a plurality of consecutive tiles within a picture according to a raster scan order. In the present disclosure, a slice according to the raster scan slice mode may be referred to as a raster scan slice.

In the rectangular slice mode, a slice may include a plurality of bricks constructing a rectangular region within a picture. In the present disclosure, a slice according to the rectangular slice mode may be referred to as a rectangular slice. A plurality of bricks included in the rectangular slice may exist according to the brick raster scan order of the slice.

Overview of Partitioning of CTU

As described above, the coding unit (CU) may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 5, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 4, by horizontal ternary splitting, two CUs having a height which is ¼ of the height of the current CU and having the same width as the current CU and a CU having a height which is half the height of the current CU and having the same width as the current CU may be generated.

Figure 6:
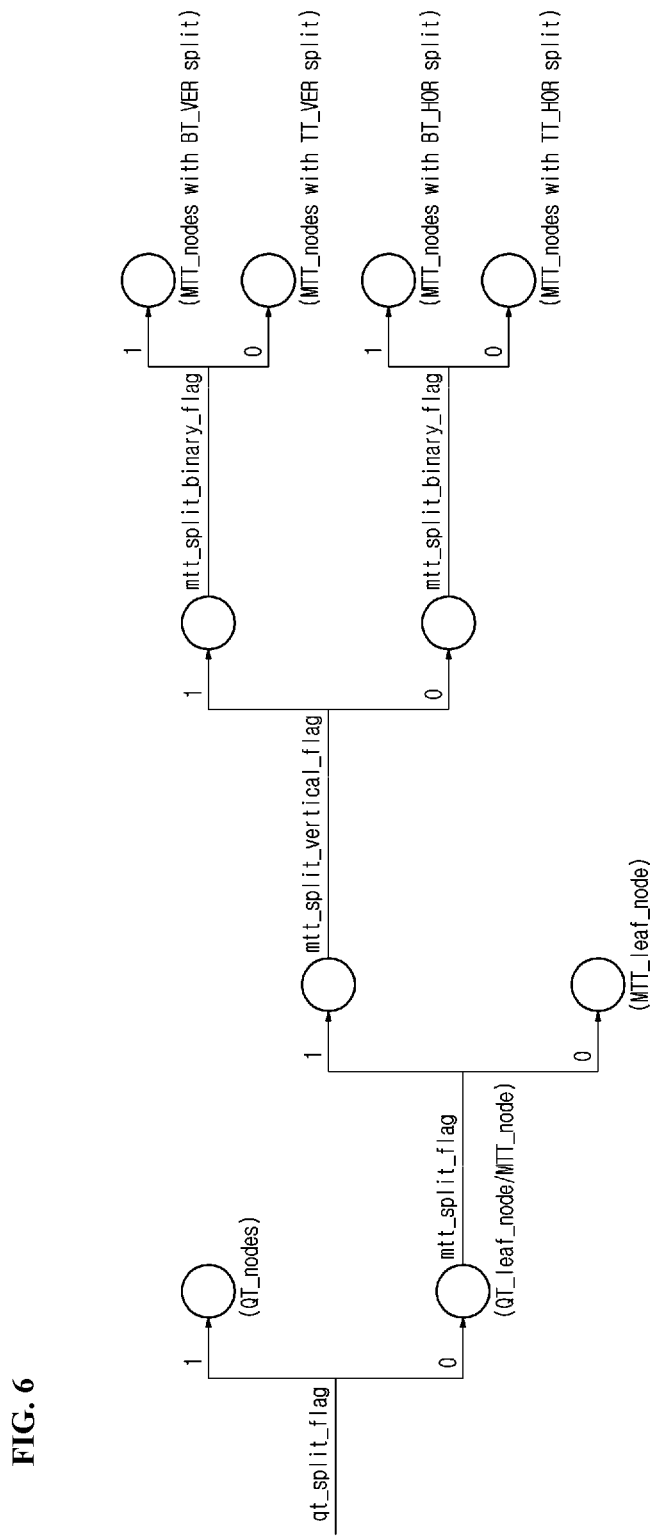
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multi-type tree structures. That is, the leaf node of the quadtree may become the node (MTT_node) of the multi-type tree. In the multi-type tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
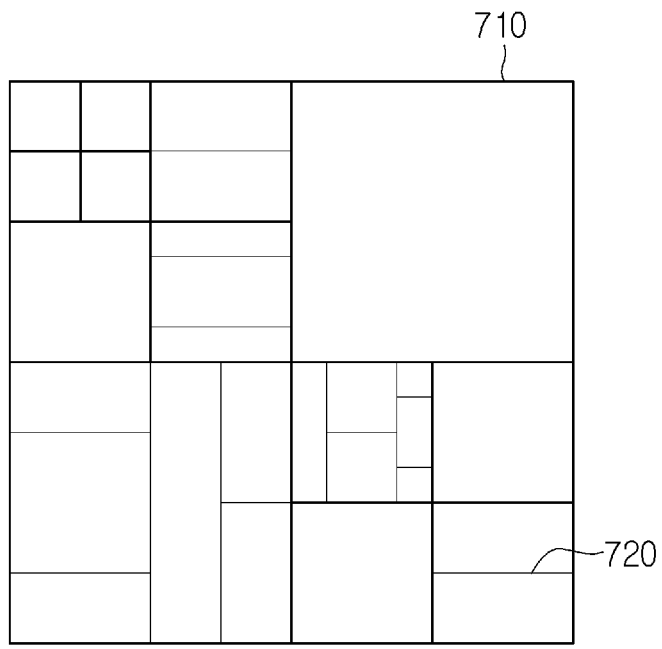
FIG. 7 is a view showing an example in which a CTU is partitioned into multiple CUs by applying a multi-type tree after applying a quadtree.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multi-type tree partitioning. The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTb Size, a plurality of TUs (TBs) having maxTb Size may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TB_s) may share the same intra prediction mode/type.

Meanwhile, for a quadtree coding tree scheme with nested multi-type tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied for the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multi-type tree. Therefore, the leaf QT node is the root node for the multi-type tree, and the leaf QT node may have a multi-type tree depth (mttDepth) 0 value. If the multi-type tree depth reaches MaxMttdepth (e.g., 4), further partitioning may not be considered further. If the width of the multi-type tree node is equal to MinBtSize and less than or equal to 2×MinTtSize, then no further horizontal partitioning may be considered. If the height of the multi-type tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied for the luma block and chroma block of the current CU. Specifically, the luma and chroma blocks in one CTU may be partitioned into the same block tree structure and, in this case, the tree structure is represented as SINGLE TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multi-type tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT split type) including information on how many blocks the leaf node of the QT structure is partitioned into and a syntax element (ex. MPT split mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

In this way, the quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Figure 8:
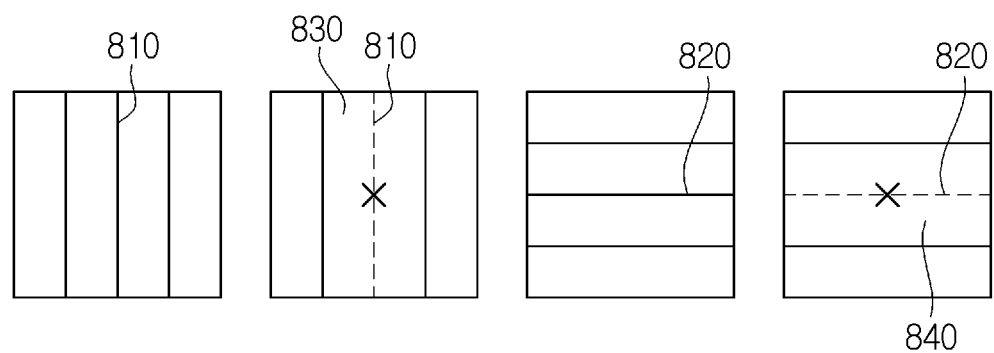
FIG. 8 shows redundant splitting patterns which may occur in binary tree splitting and ternary tree splitting.

For example, FIG. 8 shows redundant splitting patterns which may occur in binary tree splitting and ternary tree splitting. As shown in FIG. 8, continuous binary splitting 810 and 820 for one direction of two-step levels have the same coding block structure as binary splitting for a center partition after ternary splitting. In this case, binary tree splitting for center blocks 830 and 840 of ternary tree splitting may be prohibited. this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 9, when binary tree splitting for the center block of the CU is prohibited, a syntax element mtt_split_cu_binary_flag specifying whether splitting is binary splitting or ternary splitting is not signaled and the value thereof may be derived as 0 by a decoding apparatus.

Overview of Intra Prediction

Hereinafter, intra prediction according to the present disclosure will be described.

Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples adjacent to the bottom-left, a sample adjacent to a top boundary of the current block and a total of 2×nW samples adjacent to the top-right, and one sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample adjacent to the bottom-right of the current block.

Some of the neighboring reference samples of the current block have not yet been decoded or may not be available. In this case, a decoder may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode.

In addition, the prediction sample may be generated through interpolation with a first neighboring sample located in a prediction direction of the intra prediction mode of the current block and a second neighboring sample located in the opposite direction based on a prediction target sample of the current block among the neighboring reference samples. The above-described case may be referred to as linear interpolation intra prediction (LIP).

In addition, chroma prediction samples may be generated based on luma samples using a linear model. This case may be called a linear model (LM) mode.

In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. This case may be referred to as position dependent intra prediction (PDPC).

In addition, a reference sample line with highest prediction accuracy may be selected from multiple neighboring reference sample lines of the current block to derive a prediction sample using a reference sample located in a prediction direction in the corresponding line, and, at this time, information (e.g., intra_luma_ref_idx) on the used reference sample line may be encoded and signaled in a bitstream. This case may be referred to as multi-reference line (MRL) intra prediction or MRL based intra prediction.

In addition, the current block may be split into vertical or horizontal sub-partitions to perform intra prediction with respect to each sub-partition based on the same intra prediction mode. At this time, neighboring reference samples of intra prediction may be derived in units of sub-partitions. That is, a reconstructed sample of a previous sub-partition in encoding/decoding order may be used as a neighboring reference sample of a current sub-partition. In this case, the intra prediction mode for the current block equally applies to the sub-partitions and the neighboring reference samples are derived and used in units of sub-partitions, thereby increasing intra prediction performance. Such a prediction method may be referred to as intra sub-partitions (ISP) or ISP based intra prediction.

The intra prediction technique may be referred to as various terms such as intra prediction type or additional intra prediction mode to be distinguished from a directional or non-directional intra prediction mode. For example, the intra prediction technique (intra prediction type or the additional intra prediction mode) may include at least one of LIP, LM, PDPC, MRL, ISP or MIP.

The intra prediction procedure may include an intra prediction mode/type determination step, a neighboring reference sample derivation step and an intra prediction mode/type based prediction sample derivation step. In addition, if necessary, post-filtering may be further performed with respect to the derived prediction sample.

Figure 9A:
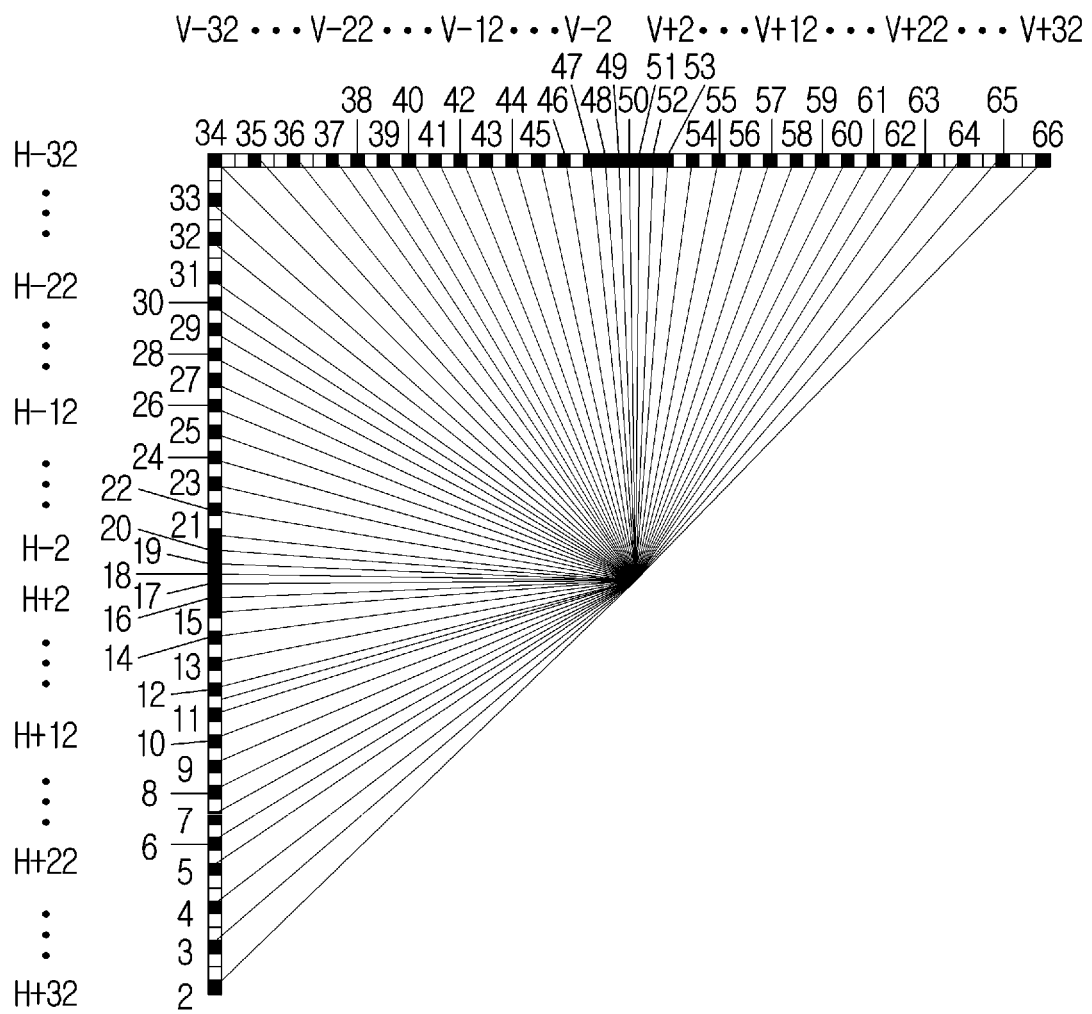
FIG. 9A is a view illustrating an intra prediction direction according to an embodiment of the present disclosure.

FIG. 9A is a view illustrating an intra prediction direction according to an embodiment of the present disclosure.

An intra prediction mode may include two non-directional intra prediction modes and 33 directional intra prediction modes. The non-directional intra prediction modes may include a planar mode and a DC mode, and the directional intra prediction modes may include intra prediction modes #2 to #34. The planar intra prediction mode may be called a planar mode and the DC intra prediction mode may be called a DC mode.

Alternatively, in order to capture any edge direction presented in natural video, as shown in FIG. 9A, the intra prediction mode may include two non-directional intra prediction modes and 65 extended directional intra prediction modes. The non-directional intra prediction modes may include a planar prediction mode and a DC prediction mode, and the extended directional intra prediction modes may include intra prediction modes #2 to #66. The intra prediction mode is applicable to blocks having all sizes and to both a luma component (luma block) and a chroma component (chroma block).

Alternatively, the intra prediction mode may include two non-directional intra prediction modes and 129 directional intra prediction modes. The non-directional intra prediction modes may include a planar prediction mode and a DC prediction mode, and the directional intra prediction modes may include intra prediction modes #2 to #130.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, top samples or both thereof is considered for LM parameter derivation and may apply only to a chroma component.

The intra prediction mode may be indexed, for example, as shown in Table 2 below.

TABLE 2

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Referring to Table 2, as a non-directional intra prediction mode, a mode number of a planar mode may be 0 and a mode number of a DC mode may be 1. In addition, mode numbers of a plurality of directional intra prediction modes may be 2 to 66. In addition, an additional intra prediction mode, mode numbers of an LT_CCLM mode, an L_CCLM mode and a T_CCLM mode may be 81 to 83.

Figure 9B:
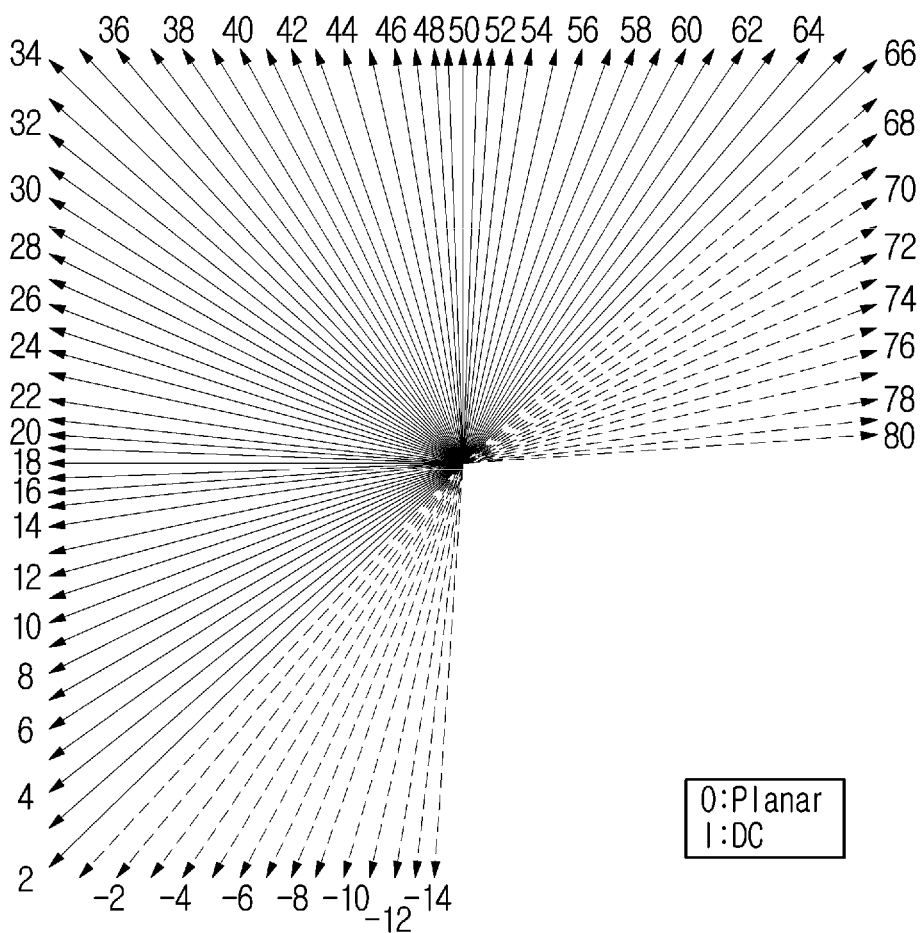
FIG. 9B is a view illustrating an intra prediction direction according to another embodiment of the present disclosure.

FIG. 9B is a view illustrating an intra prediction direction according to another embodiment of the present disclosure. In FIG. 9B, a dotted-line direction shows a wide-angle mode applying only to a non-square block.

In order to capture any edge direction presented in natural video, as shown in FIG. 9B, the intra prediction mode according to an embodiment may include two non-directional intra prediction modes and 93 directional intra prediction modes. The non-directional intra prediction modes may include a planar prediction mode and a DC prediction mode, and the directional intra prediction modes may include intra prediction modes #2 to #80 to #−1 to #−14, as denoted by arrow of FIG. 9B. The planar mode may be denoted by INTRA PLANAR, and the DC mode may be denoted by INTRA DC. In addition, the directional intra prediction mode may be denoted by INTRA_ANGULAR-14 to INTRA_ANGULAR-1 and INTRA_ANGULAR2 to INTRA_ANGULAR80.

The image encoding apparatus may encode intra prediction mode/type information specifying an intra prediction mode applied for the current block and signal it through a bitstream. In an example, the intra prediction mode/type information may include flag information (e.g., intra_luma_mpm_flag and/or intra_chroma_mpm_flag) specifying whether a most probable mode (MPM) or a remaining mode is applied for the current block. When the MPM is applied for the current block, the intra prediction mode/type information may include index information (e.g., intra_luma_mpm_idx and/or intra_chroma_mpm_idx) specifying one of intra prediction mode candidates (MPM candidates). In contrast, when the MPM is not applied for the current block, the intra prediction mode/type information may further include remaining mode information (e.g., intra_luma_mpm_remainder and/or intra_chroma_mpm_remainder) specifying one of the remaining intra prediction modes excluding the intra prediction mode candidates (MPM candidates). The image decoding apparatus may determine the intra prediction mode of the current block based on the intra prediction mode/type information received through the bitstream.

The intra prediction mode/type information may be encoded/decoded through various coding methods described in the present disclosure. For example, the intra prediction mode/type information may be encoded/decoded through entropy coding (e.g., CABAC, CAVLC) based on a truncated (rice) binary code.

Overview of Inter Prediction

Hereinafter, inter prediction according to the present disclosure will be described.

The prediction unit of an image encoding apparatus/image decoding apparatus according to the present disclosure may perform inter prediction in units of blocks to derive a prediction sample. Inter prediction may represent prediction derived in a manner that is dependent on data elements (e.g., sample values, motion information, etc.) of picture(s) other than a current picture. When inter prediction applies to the current block, a predicted block (prediction block or a prediction sample array) for the current block may be derived based on a reference block (reference sample array) specified by a motion vector on a reference picture indicated by a reference picture index. In this case, in order to reduce the amount of motion information transmitted in an inter prediction mode, motion information of the current block may be predicted in units of blocks, subblocks or samples, based on correlation of motion information between a neighboring block and the current block. The motion information may include a motion vector and a reference picture index. The motion information may further include inter prediction type (L0 prediction, L1 prediction, Bi prediction, etc.) information. When applying inter prediction, the neighboring block may include a spatial neighboring block present in the current picture and a temporal neighboring block present in the reference picture. A reference picture including the reference block and a reference picture including the temporal neighboring block may be the same or different. The temporal neighboring block may be referred to as a collocated reference block, collocated CU (ColCU) or colBlock, and the reference picture including the temporal neighboring block may be referred to as a collocated picture (colPic) or colPicture. For example, a motion information candidate list may be constructed based on the neighboring blocks of the current block, and flag or index information specifying which candidate is selected (used) may be signaled in order to derive the motion vector of the current block and/or the reference picture index.

Inter prediction may be performed based on various prediction modes. For example, in the case of a skip mode and a merge mode, the motion information of the current block may be equal to the motion information of the selected neighboring block. In the case of the skip mode, a residual signal may not be transmitted unlike the merge mode. In the case of a motion information prediction (MVP) mode, the motion vector of the selected neighboring block may be used as a motion vector predictor and a motion vector difference may be signaled. In this case, the motion vector of the current block may be derived using a sum of the motion vector predictor and the motion vector difference. In the present disclosure, the MVP mode may have the same meaning as advanced motion vector prediction (AMVP).

The motion information may include L0 motion information and/or L1 motion information according to the inter prediction type (L0 prediction, L1 prediction, Bi prediction, etc.). The motion vector in an L0 direction may be referred to as an L0 motion vector or MVL0, and the motion vector in an L1 direction may be referred to as an L1 motion vector or MVL1. Prediction based on the L0 motion vector may be referred to as L0 prediction, prediction based on the L1 motion vector may be referred to as L1 prediction, and prediction based both the L0 motion vector and the L1 motion vector may be referred to as Bi prediction. Here, the L0 motion vector may specify a motion vector associated with a reference picture list L0 (L0) and the L1 motion vector may specify a motion vector associated with a reference picture list L1 (L1). The reference picture list L0 may include pictures before the current picture in output order as reference pictures, and the reference picture list L1 may include pictures after the current picture in output order. The previous pictures may be referred to as forward (reference) pictures and the subsequent pictures may be referred to as reverse (reference) pictures. The reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 10:
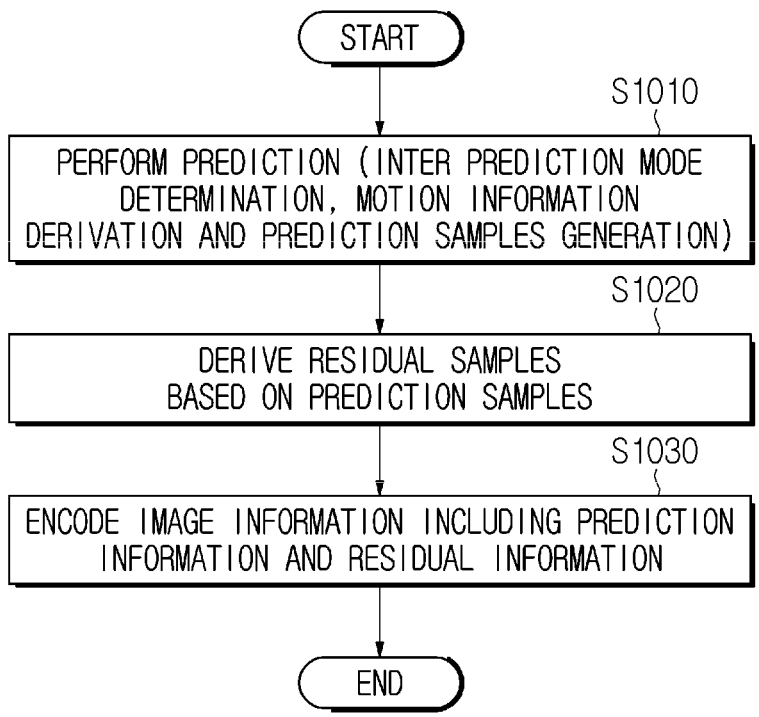
FIG. 10 is a flowchart illustrating an inter prediction based video/image encoding method.
Figure 11:
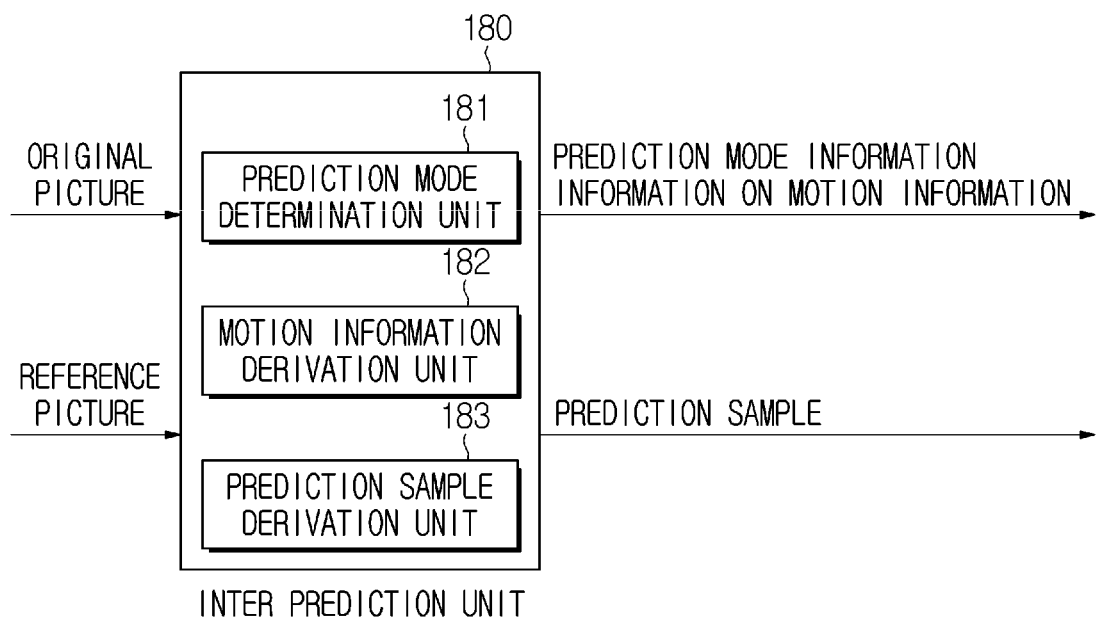
FIG. 11 is a view illustrating the configuration of an inter prediction unit 180 according to the present disclosure

FIG. 10 is a flowchart illustrating an inter prediction based video/image encoding method, and FIG. 11 is a view illustrating the configuration of an inter prediction unit 180 according to the present disclosure.

The encoding method of FIG. 10 may be performed by the image encoding apparatus of FIG. 2. Specifically, step S1010 may be performed by the inter prediction unit 180, and step S1020 may be performed by the residual processor. Specifically, step S1020 may be performed by the subtractor 115. Step S1030 may be performed by the entropy encoder 190. The prediction information of step S1030 may be derived by the inter prediction unit 180, and the residual information of step S1030 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficients may be derived as quantized transform coefficients through the quantizer 130. Information on the quantized transform coefficients may be encoded by the entropy encoder 190 through a residual coding procedure.

Referring to FIGS. 10 and 11 together, the image encoding apparatus may perform inter prediction on a current block (S1010). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 11, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose a difference from the current block is equal to or less than a predetermined criterion or a minimum. Based on this, a reference picture index specifying a reference picture in which the reference block is located may be derived, and a motion vector may be derived based on a position difference between the reference block and the current block. The image encoding apparatus may determine a mode applying to the current block among various prediction modes. The image encoding apparatus may compare rate-distortion (RD) costs for the various prediction modes and determine an optimal prediction mode of the current block. However, the method of determining the prediction mode of the current block by the image encoding apparatus is not limited to the above example, and various methods may be used.

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose a difference from the current block is equal to or less than a predetermined criterion or a minimum, among reference blocks specified by merge candidates included in the merge candidate list. In this case, a merge candidate associated with the derived reference block may be selected, and merge index information specifying the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (mvp) candidates from the neighboring blocks of the current block and construct an mvp candidate list using the derived mvp candidates. In addition, the image encoding apparatus may use the motion vector of the mvp candidate selected from among the mvp candidates included in the mvp candidate list as the mvp of the current block. In this case, for example, the motion vector indicating the reference block derived by the above-described motion estimation may be used as the motion vector of the current block, an mvp candidate with a motion vector having a smallest difference from the motion vector of the current block among the mvp candidates may be the selected mvp candidate. A motion vector difference (MVD) which is a difference obtained by subtracting the mvp from the motion vector of the current block may be derived. In this case, index information specifying the selected mvp candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S1020). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S1030). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag specifies whether a skip mode applies to the current block, and the merge flag specifies whether the merge mode applies to the current block. Alternatively, the prediction mode information may specify one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the mvp flag or the mvp index may be signaled when the MVP mode applies to the current block and may be information for selecting one of mvp candidates in an mvp candidate list. In addition, the information on the motion information may include information on the above-described MVD and/or reference picture index information. In addition, the information on the motion information may include information specifying whether to apply L0 prediction, L1 prediction or Bi prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

Figure 12:
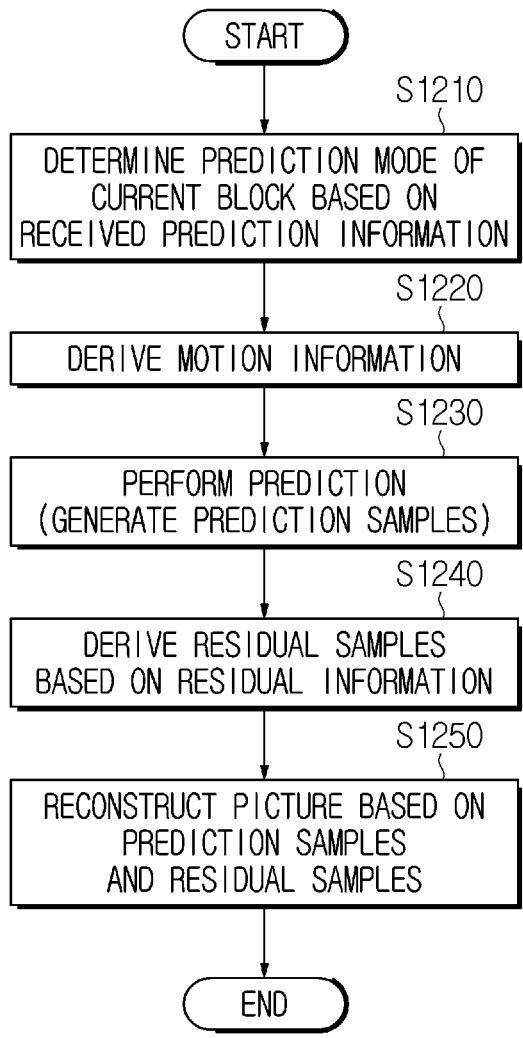
FIG. 12 is a flowchart illustrating an inter prediction based video/image decoding method.
Figure 13:
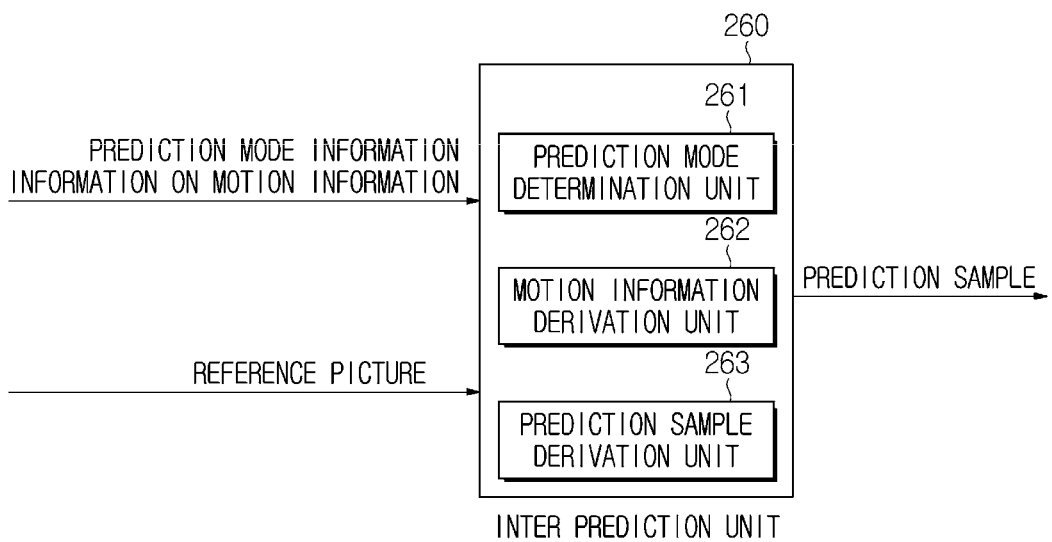
FIG. 13 is a view illustrating the configuration of an inter prediction unit 260 according to the present disclosure.

FIG. 12 is a flowchart illustrating an inter prediction based video/image decoding method, and FIG. 13 is a view illustrating the configuration of an inter prediction unit 260 according to the present disclosure.

The image decoding apparatus may perform operation corresponding to operation performed by the image encoding apparatus. The image decoding apparatus may perform prediction on a current block based on received prediction information and derive prediction samples.

The decoding method of FIG. 12 may be performed by the image decoding apparatus of FIG. 3. Specifically, steps S1210 to S1230 may be performed by the inter prediction unit 260, and the prediction information of step S1210 and the residual information of step S1240 may be obtained from a bitstream by the entropy decoder 210. The residual processor of the image decoding apparatus may derive residual samples for a current block based on the residual information. For example, the dequantizer 220 of the residual processor may perform dequantization based on dequantized transform coefficients derived based on the residual information to derive transform coefficients, and the inverse transformer 230 of the residual processor may perform inverse transform on the transform coefficients to derive the residual samples for the current block. Step S1350 may be performed by the adder 235 or the reconstructor.

Referring to FIGS. 12 and 13 together, the image decoding apparatus may determine the prediction mode of the current block based on the received prediction information (S1210). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S1220). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an mvp candidate list and use the motion vector of an mvp candidate selected from among mvp candidates included in the mvp candidate list as an mvp of the current block. The selection may be performed based on the above-described candidate selection information (mvp flag or mvp index). In this case, the MVD of the current block may be derived based on information on the MVD, and the motion vector of the current block may be derived based on mvp and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S1230). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed on all or some of the prediction samples of the current block.

For example, as shown in FIG. 13, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S1240). The image decoding apparatus may generate the reconstructed samples of the current block based on the prediction samples and the residual samples and generate a reconstructed picture based on this (S1250). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Overview of Intra Block Copy (IBC) Prediction

Hereinafter, IBC prediction according to the present disclosure will be described.

IBC prediction may be performed by a prediction unit of an image encoding/decoding apparatus. IBC prediction may be simply referred to as IBC. The IBC may be used for content image/video coding such as screen content coding (SCC). The IBC prediction may be basically performed in the current picture, but may be performed similarly to inter prediction in that a reference block is derived within the current picture. That is, IBC may use at least one of inter prediction techniques described in the present disclosure. For example, IBC may use at least one of the above-described motion information (motion vector) derivation methods. At least one of the inter prediction techniques may be partially modified and used in consideration of the IBC prediction. The IBC may refer to a current picture and thus may be referred to as current picture referencing (CPR).

For IBC, the image encoding apparatus may perform block matching (BM) and derive an optimal block vector (or motion vector) for a current block (or a current CU). The derived block vector may be signaled to the image decoding apparatus through a bitstream using a method similar to signaling of motion information (motion vector) in the above-described inter prediction. The image decoding apparatus may derive a reference block for the current block in the current picture through the signaled block vector, and derive a prediction signal (predicted block or prediction samples) for the current block through this. Here, the block vector may specify displacement from the current block to a reference block located in a previously reconstructed area in the current picture. Accordingly, the block vector (or the motion vector) may be referred to a displacement vector. Hereinafter, in IBC, the motion vector may correspond to the block vector or the displacement vector. The motion vector of the current block may include a motion vector (luma motion vector) for a luma component or a motion vector (chroma motion vector) for a chroma component. For example, the luma motion vector for an IBC-coded CU may be an integer sample unit (that is, integer precision). The chroma motion vector may be clipped in integer sample units. As described above, IBC may use at least one of inter prediction techniques, and, for example, the luma motion vector may be encoded/decoded using the above-described merge mode or MVP mode.

When the merge mode is applied for a luma IBC block, a merge candidate list for the luma IBC block may be constructed similarly to the merge candidate list in the inter prediction mode. However, the merge candidate list for the luma IBC block may not include a temporal candidate block, unlike the merge candidate list in the inter prediction mode.

When the MVP mode is applied for the luma IBC block, an mvp candidate list for the luma IBC block may be constructed similarly to the mvp candidate list in the inter prediction mode. However, the merge candidate list for the luma IBC block may not include a temporal candidate block, unlike the mvp candidate list in the inter prediction mode.

In IBC, a reference block is derived from a previously reconstructed area in the current picture. In this case, in order to reduce memory consumption and complexity of the image decoding apparatus, only a predefined area among previously reconstructed areas in the current picture may be referenced. The predefined area may include a current CTU in which the current block is included. By restricting referenceable reconstructed area to the predefined area, the IBC mode may be implemented in hardware using a local on-chip memory.

The image encoding apparatus for performing IBC may search the predefined area to determine a reference block with smallest RD cost and derive a motion vector (block vector) based on the positions of the determined reference block and the current block.

Prediction mode information on IBC may be signaled at a CU level. For example, flag information specifying whether an IBC skip/merge mode is applied for the current block and/or flag information specifying whether an IBC AMVP mode is applied for the current block may be signaled through coding_unit syntax.

In the case of the IBC skip/merge mode, a merge candidate index may be signaled to specify a block vector to be used for prediction of the current luma block among block vectors included in the merge candidate list. In this case, the merge candidate list may include IBC-encoded neighboring blocks. As described above, the merge candidate list may include a spatial merge candidate, but may not include a temporal merge candidate. In addition, the merge candidate list may further include history-based motion vector predictor (HMVP) candidates and/or pairwise candidates.

In the case of the IBC MVP mode, a block vector difference may be encoded using the same method as a motion vector difference of the above-described inter prediction mode. In the IBC MVP mode, the block vector prediction method may be performed based on an mvp candidate list including two candidates as predictors, similarly to the MVP mode. One of the two candidates may be derived from a left neighboring block of the current block and the other candidate may be derived from a top neighboring block of the current block. In this case, only when the left neighboring block or the top neighboring block is IBC-encoded, candidates may be derived from the corresponding neighboring block. If the left neighboring block or the top neighboring block is not available (for example, is not IBC-encoded), a predetermined default block vector may be included in the mvp candidate list as a predictor. In addition, in the case of the IBC MVP mode, block vector prediction similar to the MVP mode may be performed in that information (e.g., flag) specifying one of two block vector predictors is signaled as candidate selection information and used for image decoding. The mvp candidate list may include an HMVP candidate and/or a zero motion vector as the default block vector.

The HMVP candidate may be referred to as a history-based MVP candidate, and an MVP candidate used before encoding/decoding of the current block, a merge candidate or a block vector candidate may be stored in an HMVP list as HMVP candidates. Thereafter, when the merge candidate list of the current block or the mvp candidate list does not include a maximum number of candidates, candidates stored in the HMVP list may be added to the merge candidate list or mvp candidate list of the current block as HMVP candidates.

The pairwise candidate may mean a candidate derived by averaging two candidates selected according to a predetermined order from among candidates included in the merge candidate list of the current block.

Prediction mode information (e.g., pred_mode_ibc_flag) specifying whether IBC is applied for the current block may be signaled at a CU level. For example, pred_mode_ibc_flag may be signaled through coding_unit syntax. In this case, pred_mode_ibc_flag having a first value (e.g., 0) may specify that IBC is not applied for the current block. In contrast, pred_mode_ibc_flag having a second value (e.g., 1) may specify that IBC is applied for the current block.

Meanwhile, IBC may not support the merge mode and the skip mode. In addition, IBC has no restriction on a maximum block size and may not be applied for a chroma block having the number of samples of less than 16.

As described above, in order to generate the prediction block of the current block, various prediction modes such as an intra prediction mode, an inter prediction mode or IBC may be used. The image encoding apparatus may encode and signal predetermined prediction mode information through a bitstream, in order to specify the prediction mode for the current block. In addition, the image decoding apparatus may determine the prediction mode for the current block based on the predetermined prediction mode information obtained from the bitstream. Hereinafter, a method of encoding/decoding prediction mode information will be described in detail.

Figure 15:
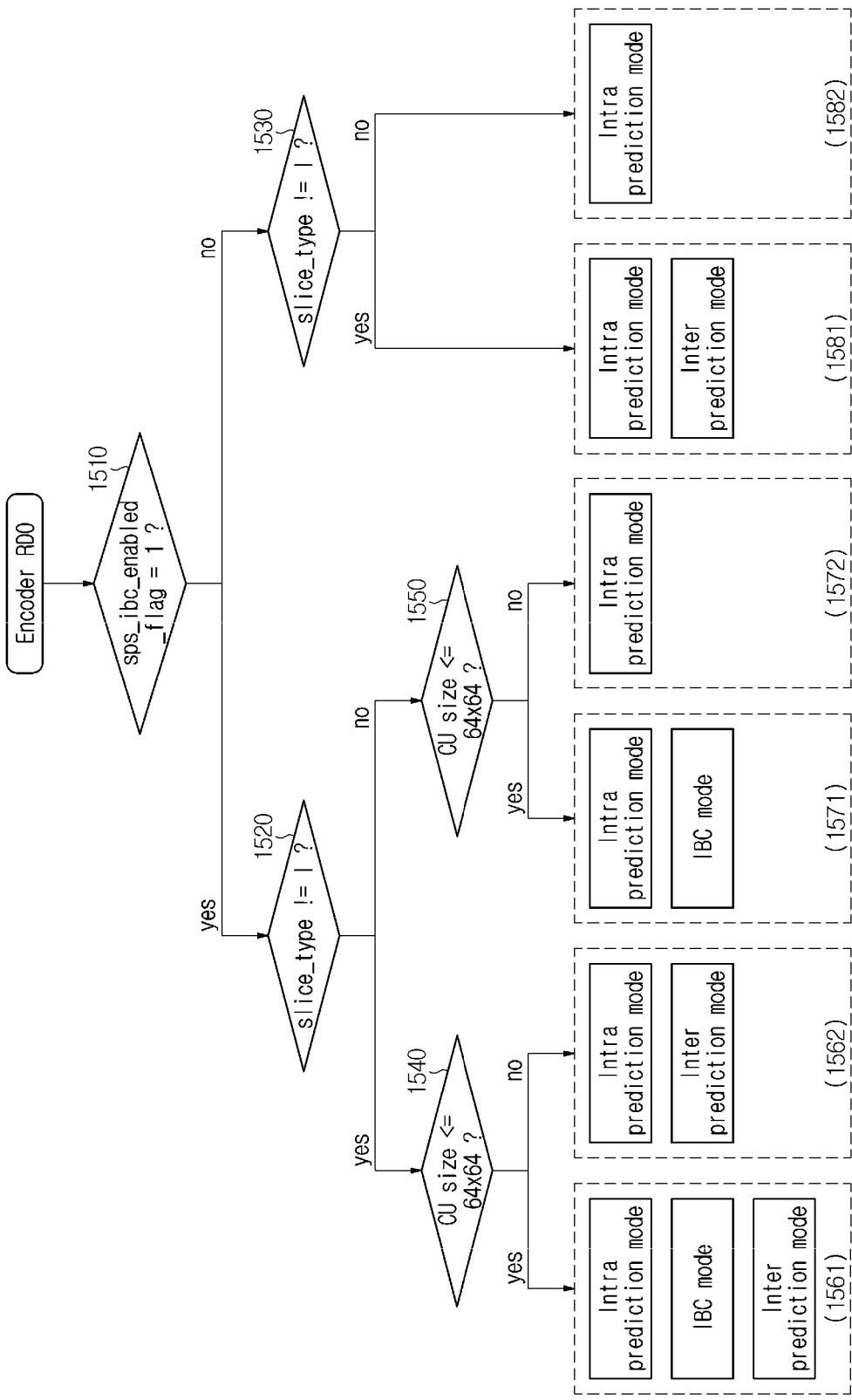
FIG. 15 is a view illustrating prediction modes applicable to a current block according to a slice type and size of the current block.

FIG. 14 is a view illustrating an example of coding_unit syntax including prediction mode information, and FIG. 15 is a view illustrating prediction modes applicable to a current block according to a slice type and size of the current block.

First, referring to FIG. 14, coding_unit syntax may include cu_skip_flag, pred_mode_flag, pred_mode_ibc_flag and pred_mode_plt_flag as prediction mode information.

Specifically, cu_skip_flag may specify whether a skip mode is applied for the current block. For example, cu_skip_flag having a first value (e.g., 0) may specify that the skip mode is not applied for the current block. In contrast, cu_skip_flag having a second value (e.g., 1) may specify that the skip mode is applied for the current block. In the case where cu_skip_flag has a second value (e.g., 1), when the current slice is a P or B slice, after parsing cu_skip_flag, no syntax element except for pred_mode_ibc_flag and merge_data syntax structures may be parsed. In contrast, in the case where cu_skip_flag has a second value (e.g., 1), when the current slice is an I slice, after parsing cu_skip_flag, no syntax element except for merge_idx may be parsed. In the case where cu_skip_flag is not present, cu_skip_flag may be inferred as a first value (e.g., 0).

pred_mode_flag may specify which of an inter prediction mode and an intra prediction mode is applied for the current block. For example, pred_mode_flag having a first value (e.g., 0) may specify that the inter prediction mode is applied for the current block. In contrast, pred_mode_flag having a second value (e.g., 1) may specify that the intra prediction mode is applied for the current block. In the case where pred_mode_flag is not present, pred_mode_flag may be inferred as follows.

First inference condition: When both the width cbWidth and height cbHeight of the current block are 4, pred_mode_flag is inferred as a second value (e.g., 1).

Second inference condition: In the case where the first condition is not satisfied, when the prediction mode type modeType of the current block is MODE_TYPE_INTRA specifying that only an intra prediction mode, IBC and a palette mode are available, pred_mode_flag is inferred as a second value (e.g., 1).

Third inference condition: In the case where both the first and second conditions are not satisfied, when the prediction mode type modeType of the current block is MODE_TYPE_INTER specifying that only an inter prediction mode is available, pred_mode_flag is inferred as a first value (e.g., 0).

Fourth inference condition: In the case where all the first to third conditions are not satisfied, pred_mode_flag is inferred as a second value (e.g., 1) when the slice type slice_type of the current block is an I slice and pred_mode_flag is inferred as a first value (e.g., 0) when the slice type slice type of the current block is a P or B slice.

pred_mode_ibc_flag may specify whether IBC is applied for the current block. For example, pred_mode_ibc_flag having a first value (e.g., 0) may specify that IBC is not applied for the current block. In contrast, pred_mode_ibc_flag having a second value (e.g., 1) may specify that IBC is applied for the current block. When pred_mode_ibc_flag is not present, pred_mode_ibc_flag may be inferred as follows.

Fifth inference condition: When cu_skip_flag has a second value (e.g., 1) and both the width cbWidth and height cbHeight of the current block are 4, pred_mode_ibc_flag is inferred as a second value (e.g., 1).

Sixth inference condition: In the case where the fifth inference condition is not satisfied, when cu_skip_flag has a second value (e.g., 1) and the prediction mode type modeType of the current block is MODE_TYPE_INTRA, pred_mode_ibc_flag may be inferred as a second value (e.g., 1).

Seventh inference condition: In the case where both the fifth and sixth conditions are not satisfied, when the width cbWidth or height cbHeight of the current block is 128, pred_mode_ibc_flag is inferred as a first value (e.g., 0).

Eighth inference condition: In the case where all the fifth to seventh conditions are not satisfied, when the prediction mode type modeType of the current block is MODE_TYPE_INTER, pred_mode_ibc_flag is inferred as a first value (e.g., 0).

Ninth inference condition: In the case where all the fifth to eighth conditions are not satisfied, when the split structure treeType of the current block is DUAL_TREE_CHROMA, pred_mode_ibc_flag is inferred as a first value (e.g., 0).

Tenth inference condition: In the case where all the fifth to ninth conditions are not satisfied, pred_mode_ibc_flag is inferred as the same value as sps_ibc_enabled_flag obtained through a sequence parameter set (SPS) when the slice type slice_type of the current block is an I slice, and pred_mode_ibc_flag is inferred as a first value (e.g., 0) when the slice type slice_type of the current block is a P or B slice. Here, sps_ibc_enabled_flag specifies whether IBC is available at a sequence level. For example, sps_ibc_enabled_flag having a first value (e.g., 0) specifies that IBC is not available, and sps_ibc_enabled_flag having a second value (e.g., 1) specifies that IBC is available.

pred_mode_plt_flag may specify whether a palette mode is applied for the current block. For example, pred_mode_plt_flag having a first value (e.g., 0) may specify that the palette mode is not applied for the current block. In contrast, pred_mode_plt_flag having a second value (e.g., 1) may specify that the palette mode is applied for the current block. In the case where pred_mode_plt_flag is not present, pred_mode_plt_flag may be inferred as a first value (e.g., 0).

Meanwhile, the above-described prediction mode information may be signaled based on the size cbWidth× cbHeight of the current block. For example, signaling conditions 1420, 1430 and 1440 of each of cu_skip_flag, pred_mode_flag and pred_mode_ibc_flag may include a detailed condition regarding whether the size cbWidth× cbHeight of the current block is 4×4. In addition, signaling conditions 1420, 1440 and 1450 of each of cu_skip_flag, pred_mode_ibc_flag and pred_mode_plt_flag may include a detailed condition regarding whether the size cbWidth× cbHeight of the current block is less than or equal to 64×64.

In addition, the above-described prediction mode information may be signaled based on the prediction mode type modeType of the current block. For example, the signaling conditions 1420 and 1440 of each of cu_skip_flag and pred_mode_ibc_flag may include a detailed condition regarding whether the prediction mode type modeType of the current block is MODE_TYPE_INTRA. In addition, the signaling condition 1450 of pred_mode_flag may include a detailed condition regarding whether the prediction mode type modeType of the current block is MODE_TYPE_ALL specifying that all prediction modes are available. In addition, the signaling condition 1450 of pred_mode_plt_flag may include a detailed condition regarding whether the prediction mode type modeType of the current block is MODE_TYPE_INTER specifying that only inter prediction is available.

However, for the current block having a size of 4×4, the inter prediction mode may not be applied and only the intra prediction mode and the palette mode may be applied. This means that the prediction mode type modeType of the current block having the size of 4×4 is only defined as MODE_TYPE_INTRA. Accordingly, when the prediction mode information is signaled by separately determining whether the size cbWidth×cbHeight of the current block is 4×4 and whether the prediction mode type modeType of the current block is MODE_TYPE_INTRA, the signaling condition becomes complicated and a problem that substantially the same condition is repeatedly determined may occur.

Meanwhile, the inter prediction mode and IBC may be restrictively applied for the current block. For example, referring to FIG. 15, as the case where IBC is available at a sequence level ('yes' of 1510) and the slice type slice_type of the current block is not an I slice ('yes' of 1520), when the size CU size of the current block is greater than 64×64 ('no' of 1540), IBC may not be applied for the current block (1561). In addition, as the case where IBC is available at a sequence level ('yes' of 1510) and the slice type slice_type of the current block is an I slice ('no' of 1520), when the size CU size of the current block is less than or equal to 64×64 ('yes' of 1550), the inter prediction mode may not be applied for the current block (1571). In contrast, when the size CU size of the current block is greater than 64×64 ('no' of 1550), both the inter prediction mode and IBC may not be applied for the current block (1572). Meanwhile, when IBC is not available at the sequence level ('no' of 1510), IBC may not be applied for the current block (1581, 1582). In addition, as the case where IBC is not available at the sequence level ('no' of 1510), when the slice type slice_type of the current block is an I slice ('no' of 1530), the inter prediction mode may not be applied for the current block (1582). In this way, in only the case where the slice type slice_type of the current block is not an I slice ('no' of 1520) and the size CU size of the current block is less than or equal to 64×64 ('yes' of 1540), both the inter prediction mode and IBC may be applied for the current block.

However, as the common signaling condition 1410 of cu_skip_flag, pred_mode_flag and pred_mode_ibc_flag, in the case where IBC is available at the sequence level (sps_ibc_enabled_flag==1), even when the slice type slice_type of the current block is an I slice or the size cbWidth×cbHeight of the current block is greater than 64×64, cu_skip_ flag may be signaled according to the separate signaling condition 1420. For example, when the size cbWidth×cbHeight of the current block is not 4×4 and the prediction mode type modeType of the current block is not MODE_TYPE_INTRA, cu_skip_flag may be signaled. According to the signaling condition 1420 of cu_skip_flag, since cu_skip_flag may be signaled even for the current block for which the inter prediction mode and/or IBC may not be applied, transmission bits may be unnecessarily wasted. In addition, when cu_skip_flag having a second value (e.g., 1) specifying that the skip mode is applied is signaled for the current block for which the inter prediction mode and/or IBC may not be applied, a problem that decoding of the current block is impossible may occur.

In order to solve the above-described problems, the prediction mode type modeType of the current block may be reset to MODE_TYPE_INTRA based on at least one of the slice type of the current block or the size of the current block. In addition, based on the reset prediction mode type modeType, the prediction mode information of the current block may be signaled.

Hereinafter, embodiments of the present disclosure will be described in detail with reference to the accompanying drawings.

Embodiment 1

FIG. 16 is a view illustrating coding_unit syntax according to an embodiment of the present disclosure. The prediction mode information (cu_skip_flag, pred_mode_flag, pred_mode_ibc_flag and pred_mode_plt_flag) included in the coding_unit syntax was described above with reference to FIG. 14 and a repeated description thereof will be omitted.

Referring to FIG. 16, the prediction mode type modeType of the current block may be set to a call input value of the coding_unit syntax. Here, the current block is an application target of the recursively called coding_unit syntax and may correspond to the leaf node of the split tree structure. In addition, the prediction mode type modeType of the current block may be reset based on the size cbWidth×cbHeight of the current block (1610). For example, the prediction mode type modeType of the current block may be reset based on a result of comparing the size cbWidth×cbHeight of the current block with a predetermined reference value.

The reference value may be determined to be 4×4 which is a block size in which only the intra prediction mode and the palette mode are available, as shown in FIG. 16. In this case, the prediction mode type modeType of the current block may be reset to MODE_TYPE_INTRA based on whether the size cbWidth×cbHeight of the current block is 4×4. For example, when both the width cbWidth and height cbHeight of the current block are 4, the prediction mode type modeType of the current block may be reset to MODE_TYPE_INTRA. In contrast, when at least one of the width cbWidth or height cbHeight of the current block is not 4, the prediction mode type modeType of the current block may be reset to the call input value of the coding_unit syntax (that is, the original value is maintained).

As whether the size cbWidth×cbHeight of the current block is 4×4 is reflected in the prediction mode type modeType, from the signaling conditions 1620, 1630 and 1640 of each of cu_skip_flag, pred_mode_flag and pred_mode_ibc_flag, detailed conditions regarding whether the size cbWidth×cbHeight of the current block is 4×4 may be removed. That is, in case of cu_skip_flag, pred_mode_flag and pred_mode_ibc_flag, without separately determining whether the size cbWidth×cbHeight of the current block is 4×4, it may be signaled based on the prediction mode type modeType. For example, when the prediction mode type modeType of the current block is MODE_TYPE_INTRA, cu_skip_flag and pred_mode_flag are not signaled, pred_mode_ibc_flag may be signaled according to other detailed conditions.

In another example, the reference value may be determined to 64×64 which is a maximum block size in which IBC is available. In addition, the prediction mode type modeType of the current block may be reset to MODE_TYPE_INTRA based on whether the size cbWidth×cbHeight of the current block is greater than 64×64. For example, in the case where at least one of the width cbWidth or height cbHeight of the current block is greater than 64, the prediction mode type modeType of the current block may be reset to MODE_TYPE_INTRA. In contrast, in the case where both the width cbWidth and height cbHeight of the current block are less than or equal to 64, the prediction mode type modeType of the current block may be reset to the call input value of the coding_unit syntax (that is, the original value is maintained).

As whether the size cbWidth×cbHeight of the current block is greater than 64×64 is reflected in the prediction mode type modeType, signaling of cu_skip_flag for the current block of greater than 64×64 may be limited based on the prediction mode type modeType (1620). In this case, cu_skip_flag may be inferred as a first value (e.g., 0).

As described above, according to Embodiment 1 of the present disclosure, since it is not necessary to separately determine whether the size cbWidth×cbHeight of the current block is 4×4 in order to signal the prediction mode information of the current block, the signaling condition of the prediction mode information may be simplified (that is, clean-up of coding_unit syntax). In addition, by resetting the prediction mode type modeType of the current block of 4×4 or greater than 64×64 to MODE_TYPE_INTRA, signaling of cu_skip_flag may be limited for the current block for which the inter prediction mode and/or IBC may not be applied.

Embodiment 2

FIG. 17 is a view illustrating coding_unit syntax according to another embodiment of the present disclosure. The prediction mode information (cu_skip_flag, pred_mode_flag, pred_mode_ibc_flag and pred_mode_plt_flag) included in the coding_unit syntax was described above with reference to FIG. 14 and a repeated description thereof will be omitted.

Referring to FIG. 17, the prediction mode type modeType of the current block may be set to a call input value of the coding_unit syntax. Here, the current block is an application target of the recursively called coding_unit syntax and may correspond to the leaf node of the split tree structure. In addition, the prediction mode type modeType of the current block may be reset based on the slice type slice type of the current block and the size cbWidth×cbHeight of the current block (1710). For example, the prediction mode type modeType of the current block may be reset based on whether the slice type slice_type of the current block is an I slice (first resetting condition) and a result of comparing the size cbWidth×cbHeight of the current block with a predetermined reference value (second resetting condition).

The reference value may be determined to be 4×4 which is a block size in which only the intra prediction mode and the palette mode are available, as shown in FIG. 17. In this case, when both the width cbWidth and height cbHeight of the current block are 4, the second resetting condition may be true. In contrast, when at least one of the width cbWidth or height cbHeight of the current block is not 4, the second resetting condition may be false.

In another example, the predetermined reference value may be determined to be 64×64 which is a maximum block size in which IBC is available. In this case, when both the width cbWidth and height cbHeight of the current block are less than or equal to 64, the second resetting condition may be true. In contrast, when at least one of the width cbWidth or height cbHeight of the current block is greater than 64, the second resetting condition may be false.

The first resetting condition and the second resetting condition may construct an OR condition, as shown in FIG. 16. For example, when at least one of the first resetting condition or the second resetting condition is true, the prediction mode type modeType of the current block may be reset to MODE_TYPE_INTRA. In contrast, when both the first resetting condition and the second resetting condition are false, the prediction mode type modeType of the current block may be reset to the call input value of the coding_unit syntax. That is, in this case, the prediction mode type modeType of the current block may be maintained as an original value.

In another example, the first resetting condition and the second resetting condition may construct an AND condition. For example, when both the first resetting condition and the second resetting condition are true, the prediction mode type modeType of the current block may be reset to MODE_TYPE_INTRA. In contrast, when at least one of the first resetting condition or the second resetting condition is false, the prediction mode type modeType of the current block may be reset to the call input value of the coding_unit syntax. That is, in this case, the prediction mode type modeType of the current block may be maintained as an original value.

As the slice type slice_type of the current block and the size cbWidth×cbHeight of the current block are reflected in the prediction mode type modeType, from the signaling conditions 1720, 1730 and 1740 of each of cu_skip_flag, pred_mode_flag and pred_mode_ibc_flag, a first detailed condition regarding whether the slice type slice_type of the current block is an I slice and a second detailed condition regarding whether the size cbWidth×cbHeight of the current block is 4×4 may be removed. That is, in case of cu_skip_flag, pred_mode_flag and pred_mode_ibc_flag, without separately determining the first detailed condition and the second detailed condition, it may be signaled based on the prediction mode type modeType of the current block. For example, when the prediction mode type modeType of the current block is MODE_TYPE_INTRA, cu_skip_flag and pred_mode_flag may not be signaled, pred_mode_ibc_flag may be signaled according to other detailed conditions. In addition, for the current block for which the inter prediction mode and/or IBC may not be applied, signaling of cu_skip_flag and pred_mode_ibc_flag may be limited (1720, 1740). In this case, each of cu_skip_flag and pred_mode_ibc_flag may be inferred as a first value (e.g., 0).

Meanwhile, as the signaling conditions 1720, 1730 and 1740 of each of cu_skip_flag, pred_mode_flag and pred_mode_ibc_flag are simplified, the semantics of each of pred_mode_flag and pred_mode_ibc_flag described above with reference to FIG. 14 may be partially changed.

In an example, among the first to fourth inference conditions of pred_mode_flag described above with reference to FIG. 14, the first inference condition regarding whether the size cbWidth×cbHeight of the current block is 4×4 may be removed. In addition, the fifth to tenth inference conditions of pred_mode_ibc_flag described above with reference to FIG. 14 may be replaced with the following conditions.

Eleventh inference condition: In the case where i) IBC is available at the sequence level (sps_ibc_enabled_flag==1), ii) the size cbWidth×cbHeight of the current block is less than 128×128, iii) cu_skip_flag has a first value (e.g., 0), iv) the prediction mode type modeType of the current block is MODE_TYPE_INTRA and v) the split structure treeType of the current block is not DUAL_TREE_CHROMA, pred_mode_ibc_flag is inferred as a second value (e.g., 1).

Twelfth inference condition: In the case where the eleventh inference condition is not satisfied, pred_mode_ibc_flag is inferred as a first value (e.g., 0).

In another example, from the first to fourth inference conditions pred_mode_flag described above with reference to FIG. 14, the first inference condition regarding whether the size cbWidth×cbHeight of the current block is 4×4 may be removed, and the fourth inference condition may be changed to pred_mode_flag being inferred as a first value (e.g., 0) regardless of the slice type slice_type of the current block.

In another example, from the fifth to tenth inference conditions pred_mode_flag described above with reference to FIG. 14, the fifth inference condition regarding whether the size cbWidth×cbHeight of the current block is 4×4 may be removed, and the tenth inference condition may be changed to pred_mode_flag being inferred as a first value (e.g., 0) regardless of the slice type slice_type of the current block.

Meanwhile, as the signaling conditions 1720, 1730 and 1740 of each of cu_skip_flag, pred_mode_flag and pred_mode_ibc_flag are simplified, from the signaling condition 1750 of pred_mode_plt_flag, the third detailed condition regarding whether cu_skip_flag has a first value (e.g., 0) and the fourth detailed condition regarding whether the prediction mode type modeType of the current block is MODE_TYPE_INTER may be removed. That is, in case of pred_mode_plt_flag, without separately determining the third detailed condition and the fourth detailed condition, it may be signaled based on the value of a variable CuPredMode determined based on pred_mode_flag. Here, CuPredMode specifies the prediction mode of the current block, and may be determined to be MODE_INTER or MODE_INTRA based on pred_mode_flag. For example, when pred_mode_flag has a first value (e.g., 0), CuPredMode may be determined to be MODE_INTER specifying that the prediction mode of the current block is an inter prediction mode. In contrast, when pred_mode_flag has a second value (e.g., 1), CuPredMode may be determined to be MODE_INTRA specifying that the prediction mode of the current block is an intra prediction mode.

As described above, according to Embodiment 2 of the present disclosure, since it is not necessary to separately determine whether the slice type slice_type of the current block is an I slice and whether the size cbWidth×cbHeight of the current block is 4×4 in order to signal the prediction mode information of the current block, the signaling condition of the prediction mode information may be simplified (that is, clean-up of coding_unit syntax). In addition, by resetting, to MODE_TYPE_INTRA, the prediction mode type modeType of the current block of 4×4 or greater than 64×64 while belonging to the I slice, signaling of cu_skip- _flag may be limited for the current block for which the inter prediction mode and/or IBC may not be applied.

Embodiment 3

FIG. 18 is a view illustrating coding_unit syntax according to another embodiment of the present disclosure. The prediction mode information (cu_skip_flag, pred_mode_flag, pred_mode_ibc_flag and pred_mode_plt_flag) included in the coding_unit syntax was described above with reference to FIG. 14 and a repeated description thereof will be omitted.

Referring to FIG. 18, the prediction mode type modeType of the current block may be set to a call input value of the coding_unit syntax. Here, the current block is an application target of the recursively called coding_unit syntax and may correspond to the leaf node of the split tree structure. In addition, the prediction mode type modeType of the current block may be reset based on the slice type slice_type of the current block (1810). For example, in the case where the slice type slice_type of the current block is an I slice, the prediction mode type modeType of the current block may be reset to MODE_TYPE_INTRA. In contrast, in the case where the slice type slice_type of the current block is not an I slice (e.g., P or B slice), the prediction mode type modeType of the current block may be reset to the call input value of the coding_unit syntax. That is, in this case, the prediction mode type modeType of the current block may be maintained as an original value.

Therefore, even in the case where IBC is available at the sequence level as the common signaling condition 1820 of cu_skip_flag, pred_mode_flag and pred_mode_ibc_flag (sps_ibc_enabled_flag==1), when the slice type slice_type of the current block is an I slice, since the prediction mode type modeType is MODE_TYPE_INTRA, signaling of cu_skip_flag may be limited according to the separate signaling condition 1830.

Meanwhile, in an example, the resetting condition 1810 of the prediction mode type modeType may further include a condition regarding the size cbWidth×cbHeight of the current block. For example, the prediction mode type modeType of the current block may be reset to MODE_TYPE_INTRA based on whether the slice type slice_type of the current block is an I slice and a result of comparing the size cbWidth×cbHeight of the current block with a predetermined reference value. Here, the predetermined reference value may be determined to 4×4 which is a block size in which only the intra prediction mode and the palette mode are available or 64×64 which is a maximum block size in which IBC is available. In addition, the condition regarding the slice type slice type of the current block and the condition regarding the size cbWidth×cbHeight of the current block may construct an OR condition or an AND condition. For example, in the case where the slice type slice_type of the current block is an I slice or at least one of the width cbWidth or height cbHeight of the current block exceeds 64, the prediction mode type modeType of the current block may be reset to MODE_TYPE_INTRA. Alternatively, only in the case where the slice type slice_type of the current block is an I slice and at least one of the width cbWidth or height cbHeight of the current block exceeds 64, the prediction mode type modeType of the current block may be reset to MODE_TYPE_INTRA.

As described above, according to Embodiment 3 of the present disclosure, by resetting the prediction mode type modeType of the current block belonging to the I slice to MODE_TYPE_INTRA, signaling of cu_skip_flag may be limited for the current block for which the inter prediction mode may not be applied. In addition, by resetting the prediction mode type modeType of the current block of 4×4 or greater than 64×64 to MODE_TYPE_INTRA, signaling of cu_skip_flag may be limited for the current block for which the inter prediction mode and/or IBC may not be applied.

Embodiment 4

FIG. 19 is a view illustrating coding_unit syntax according to another embodiment of the present disclosure. The prediction mode information (cu_skip_flag, pred_mode_flag, pred_mode_ibc_flag and pred_mode_plt_flag) included in the coding_unit syntax was described above with reference to FIG. 14 and a repeated description thereof will be omitted.

Referring to FIG. 19, the prediction mode type modeType of the current block may be set to a call input value of the coding_unit syntax. Here, the current block is an application target of the recursively called coding_unit syntax and may correspond to the leaf node of the split tree structure. Unlike Embodiments 1 to 3 of the present disclosure described above, the resetting process of the prediction mode type modeType may be skipped.

The signaling condition 1920 of cu_skip_flag may include a detailed condition regarding whether the slice type slice_type of the current block is an I slice. For example, in the case where the slice type slice_type of the current block is an I slice, cu_skip_flag may not be signaled. In contrast, in the case where the slice type slice_type of the current block is not an I slice (e.g., P or B slice), cu_skip_flag may be signaled according to other detailed conditions. That is, cu_skip_flag may be explicitly signaled for the current block belonging to the P or B slice.

Therefore, even in the case where IBC is available at the sequence level as the common signaling condition 1910 of cu_skip_flag, pred_mode_flag and pred_mode_ibc_flag (sps_ibc_enabled_flag==1), when the slice type slice_type of the current block is an I slice, since the slice type slice_type is an I slice, signaling of cu_skip_flag may be limited according to the separate signaling condition 1920.

As described above, according to Embodiment 4 of the present disclosure, signaling of cu_skip_flag may be limited for the current block belonging to the I slice.

Image Encoding Method

Hereinafter, a method of encoding an image by an image encoding apparatus will be described in detail based on the above-described embodiments. The image encoding apparatus may include a memory and at least one processor, and the image encoding method may be performed by the at least one processor.

Figure 20:
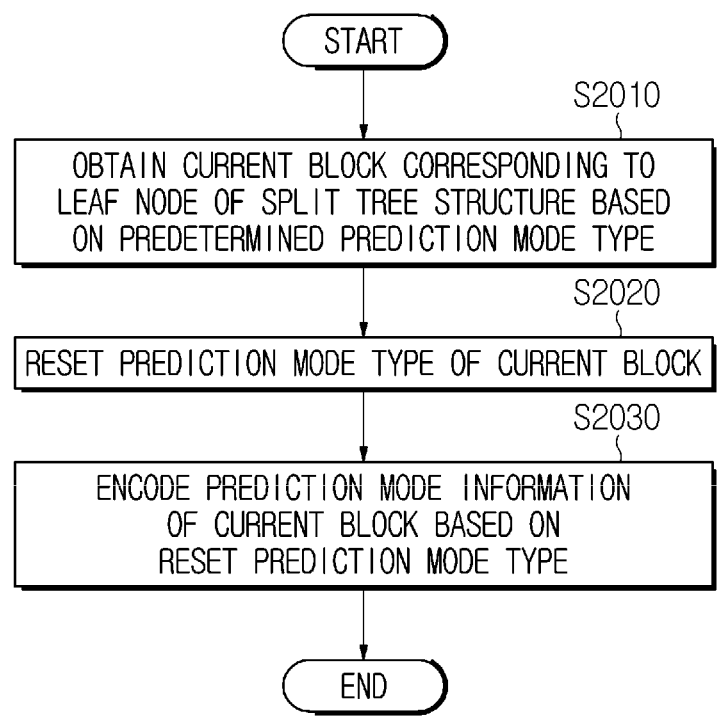
FIG. 20 is a flowchart illustrating an image encoding method according to an embodiment of the present disclosure.

FIG. 20 is a flowchart illustrating an image encoding method according to an embodiment of the present disclosure.

Referring to FIG. 20, the image encoding apparatus may obtain a current block corresponding to a leaf node of a split tree structure based on a predetermined prediction mode type (e.g., modeType) (S2010). Here, the predetermined prediction mode type is the prediction mode type of the current block and may be determined based on prediction mode characteristic information (e.g., modeTypeCondition) of a higher-layer block. For example, in the case where the prediction mode characteristic information of the higher-layer block has a first value (e.g., 0), the predetermined prediction mode type may be determined to be a prediction mode type of a higher-layer block. In contrast, in the case where the prediction mode characteristic information of the higher-layer block has a second value (e.g., 1), the predetermined prediction mode type may be determined to be MODE_TYPE_INTRA. In contrast, in the case where the prediction mode characteristic information of the higher-layer block has a third value (e.g., 2), the predetermined prediction mode type may be determined to be MODE_TYPE_INTRA or MODE_TYPE_INTER.

Meanwhile, the prediction mode characteristic information of the higher-layer block may have any one of the first to third values (e.g., 0, 1 and 2) based on a predetermined condition.

Specifically, in the case where at least one of Conditions 1-1 to 1-4 below is satisfied, the prediction mode characteristic information of the higher-layer block may be determined to be a first value (e.g., 0).

Condition 1-1: the higher-layer block is included in an I slice, each CTU included in the corresponding slice is implicitly quadtree-split into 64×64 luma sample CUs, and the luma sample CU is a root node of a dual tree.

Condition 1-2: the prediction mode type (e.g., modeType-Curr) of the higher-layer block is not MODE_TYPE_ALL.

Condition 1-3: the color format of the higher-layer block is a monochrome format (e.g., sps_chroma_format_idc==0).

Condition 1-4: the color format of the higher-layer block is a 4:4:4 format (e.g., sps_chroma_format_idc==3).

In the case where all the above-described conditions are not satisfied and at least one of the Conditions 2-1 to 2-3 below is satisfied, the prediction mode characteristic information of the higher-layer block may be determined to be a second value (e.g., 1).

Condition 2-1: the product of the width and height of the higher-layer block is 64 and the split mode of the higher-layer block is a quadtree split mode.

Condition 2-2: the product of the width and height of the higher-layer block is 64 and the split mode of the higher-layer block is a horizontal ternary split mode or a vertical ternary split mode.

Condition 2-3: the product of the width and height of the higher-layer block is 32 and the split mode of the higher-layer block is a horizontal binary split mode or a vertical binary split mode.

In the case where all the above-described conditions are not satisfied and at least one of the Conditions 3-1 to 3-4 below is satisfied, the prediction mode characteristic information of the higher-layer block belonging to the I slice may be determined to be a second value (e.g., 1) and the prediction mode characteristic information of the higher-layer block doing not belong to the I slice may be determined to be a third value (e.g., 2).

Condition 3-1: the product of the width and height of the higher-layer block is 64 and the split mode of the higher-layer block is a horizontal binary split mode or a vertical binary split mode.

Condition 3-2: the product of the width and height of the higher-layer block is 128 and the split mode of the higher-layer block is a horizontal ternary split mode or a vertical ternary split mode.

Condition 3-3: the width of the higher-layer block is 8 and the split mode of the higher-layer block is a vertical binary split mode.

Condition 3-4: the width of the higher-layer block is 16, the quadtree split of the higher-layer block is now allowed (e.g., split_qt_flag==0), and the split mode of the higher-layer block is a vertical ternary split mode.

Meanwhile, in the case where all the above-described conditions are not satisfied, the prediction mode characteristic information of the higher-layer block may be determined to be a first value (e.g., 0).

The image encoding apparatus may determine the prediction mode type of the current block based on the prediction mode characteristic information of the higher-layer block determined according to the above-described conditions. In addition, the image encoding apparatus may obtain the current block by splitting the higher-layer block based on the determined prediction mode type. For example, when the prediction mode type of the current block is MODE_TYPE_INTRA, the image encoding apparatus may obtain the current block by splitting the higher-layer block with a dual tree structure. In contrast, when the prediction mode type of the current block is not MODE_TYPE_INTRA (e.g., MODE_TYPE_ALL or MODE_TYPE_INTER), the image encoding apparatus may obtain the current block by splitting the higher-layer block according to the split structure of the higher-layer block.

The image encoding apparatus may reset the prediction mode type of the current block (S2020).

In an embodiment, the prediction mode type of the current block may be reset to an intra type (e.g., MODE_TYPE_INTRA) based on the size of the current block.

For example, when at least one of the width or height of the current block is greater than 64, the prediction mode type of the current block may be reset to MODE_TYPE_INTRA. In contrast, when both the width and height of the current block are less than 64, the prediction mode type of the current block may be reset to the call input value (that is, the prediction mode type of S2010) of the coding_unit syntax. In this way, as whether the size of the current block is greater than 64×64 is reflected in the prediction mode type, for the current block of greater than 64×64, signaling of cu_skip_flag may be limited based on the prediction mode type.

Alternatively, when both the width and height of the current block are 4, the prediction mode type of the current block may be reset to MODE_TYPE_INTRA. In contrast, when at least one of the width or height of the current block is not 4, the prediction mode type of the current block may be reset to the above-described call input value (that is, the prediction mode type of S2010) of the coding_unit syntax. In this way, when whether the size of the current block is 4×4 is reflected in the prediction mode type, in case of cu_skip_flag, pred_mode_flag and pred_mode_ibc_flag, without separately determining whether the size of the current block is 4×4, it may be signaled based on the prediction mode type.

In another example, the prediction mode type of the current block may be reset to an intra type (e.g., MODE_TYPE_INTRA) based on the slice type of the current block. For example, in the case where the slice type of the current block is an I slice, the prediction mode type of the current block may be reset to MODE_TYPE_INTRA. In contrast, in the case where the slice type of the current block is not an I slice (e.g., P or B slice), the prediction mode type of the current block may be reset to the above-described call input value (that is, the prediction mode type of S2010) of the coding_unit syntax. In this way, as whether the slice type of the current block is an I slice is reflected in the prediction mode type, signaling of cu_skip_flag for the current block belonging to the I slice may be limited. For example, as described above with reference to FIG. 18, as IBC is available at the sequence level (sps_ibc_enabled_flag==1), even when the common signaling condition 1820 of cu_skip_flag, pred_mode_flag and pred_mode_ibc_flag is true, in the case where the prediction mode type modeType of the current block is MODE_TYPE_INTRA, signaling of cu_skip_flag may be limited according to the separate signaling condition 1830.

In another example, the prediction mode type of the current block may be reset to an intra type (e.g., MODE_TYPE_INTRA) based on the slice type of the current block and the size of the current block. For example, in the case where the slice type of the current block is an I slice and at least one of the width or height of the current block is greater than 64, the prediction mode type of the current block may be reset to MODE_TYPE_INTRA. In contrast, in the case where the slice type of the current block is not an I slice (e.g., P or B slice) or both the width and height of the current block are less than or equal to 64, the prediction mode type of the current block may be reset to the above-described call input value (that is, the prediction mode type of S2010) of the coding_unit syntax. In this way, as whether the slice type of the current block is an I slice and whether the size of the current block exceeds 64×64 are reflected in the prediction mode type, signaling of cu_skip_flag may be limited for the current block for which the inter prediction mode and/or IBC may not be applied.

The image encoding apparatus may encode the prediction mode information of the current block based on the prediction mode type reset according to the above-described method (S2030). Here, the prediction mode information of the current block may include cu_skip_flag specifying whether the skip mode is applied, pred_mode_flag specifying whether the intra prediction mode or the inter prediction mode is applied, pred_mode_ibc_flag specifying whether IBC is applied, and pred_mode_plt_flag specifying whether the palette mode is applied. Details of the above-described prediction mode information was described above with reference to FIGS. 14 to 19.

As described above, according to the image encoding method of an embodiment of the present disclosure, the prediction mode type of the current block may be reset to a predetermined prediction mode type (e.g., MODE_TYPE_INTRA) based on at least one of the slice type or size of the current block. In addition, the prediction mode information of the current block may be encoded based on the reset prediction mode type. Therefore, the signaling condition of the prediction mode information may be simplified and signaling of cu_skip_flag may be limited for the current block for which the inter prediction mode and/or IBC may not be applied.

Image Decoding Method

Hereinafter, a method of decoding an image by an image decoding apparatus will be described in detail based on the above-described embodiments. The image decoding apparatus may include a memory and at least one processor, and the image decoding method may be performed by the at least one processor.

Figure 21:
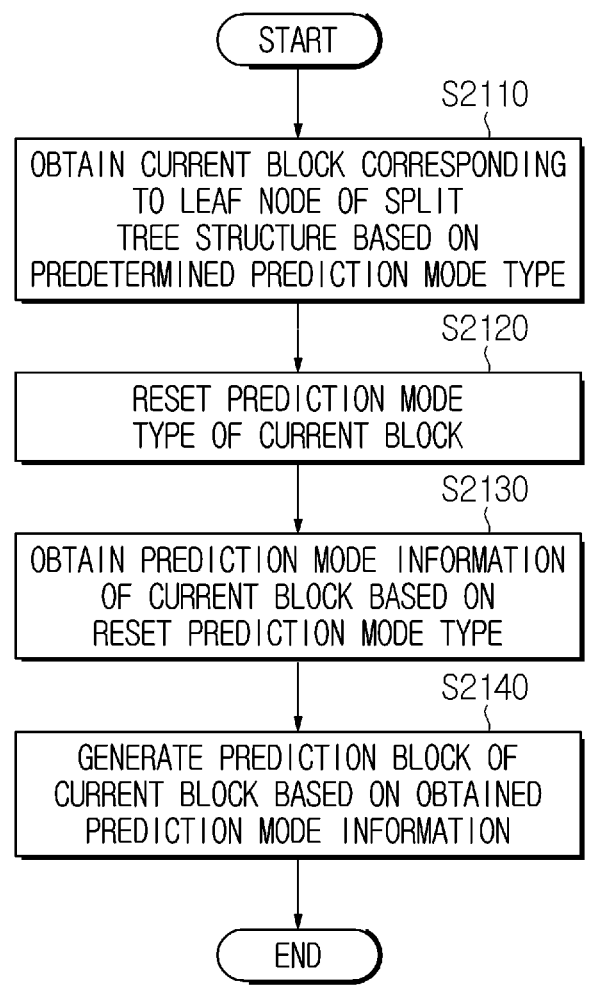
FIG. 21 is a flowchart illustrating an image decoding method according to an embodiment of the present disclosure.

FIG. 21 is a flowchart illustrating an image decoding method according to an embodiment of the present disclosure.

Referring to FIG. 21, the image decoding apparatus may obtain a current block corresponding to a leaf node of a split tree structure based on a predetermined prediction mode type (e.g., modeType) (S2110). Here, the predetermined prediction mode type is the prediction mode type of the current block and may be determined based on prediction mode characteristic information (e.g., modeTypeCondition) of a higher-layer block. For example, in the case where the prediction mode characteristic information of the higher-layer block has a first value (e.g., 0), the predetermined prediction mode type may be determined to be a prediction mode type of a higher-layer block. In contrast, in the case where the prediction mode characteristic information of the higher-layer block has a second value (e.g., 1), the predetermined prediction mode type may be determined to be MODE_TYPE_INTRA. In contrast, in the case where the prediction mode characteristic information of the higher-layer block has a third value (e.g., 2), the predetermined prediction mode type may be determined to be MODE_TYPE_INTRA or MODE_TYPE_INTER. Meanwhile, the prediction mode characteristic information of the higher-layer block may have any one of the first to third values (e.g., 0, 1 and 2) based on a predetermined condition, and the predetermined condition was described above with reference to FIG. 20.

In this way, the image decoding apparatus may determine the prediction mode type of the current block based on the prediction mode characteristic information of the higher-layer block. In addition, the image decoding apparatus may obtain the current block by splitting the higher-layer block based on the determined prediction mode type. For example, when the prediction mode type of the current block is MODE_TYPE_INTRA, the image decoding apparatus may obtain the current block by splitting the higher-layer block with a dual tree structure. In contrast, when the prediction mode type of the current block is not MODE_TYPE_INTRA (e.g., MODE_TYPE ALL or MODE_TYPE_INTER), the image decoding apparatus may obtain the current block by splitting the higher-layer block according to the split structure of the higher-layer block.

The image decoding apparatus may reset the prediction mode type of the current block (S2120).

In an embodiment, the prediction mode type of the current block may be reset to an intra type (e.g., MODE_TYPE_INTRA) based on the size of the current block.

For example, when at least one of the width or height of the current block is greater than 64, the prediction mode type of the current block may be reset to MODE_TYPE_INTRA. In contrast, when both the width and height of the current block are less than 64, the prediction mode type of the current block may be reset to the call input value (that is, the prediction mode type of S2110) of the coding_unit syntax. Alternatively, when both the width and height of the current block are 4, the prediction mode type of the current block may be reset to MODE_TYPE_INTRA. In contrast, when at least one of the width or height of the current block is not 4, the prediction mode type of the current block may be reset to the above-described call input value (that is, the prediction mode type of S2110) of the coding_unit syntax.

In another example, the prediction mode type of the current block may be reset to a predetermined prediction mode type (e.g., MODE_TYPE_INTRA) based on the slice type of the current block. For example, in the case where the slice type of the current block is an I slice, the prediction mode type of the current block may be reset to MODE_TYPE_INTRA. In contrast, in the case where the slice type of the current block is not an I slice (e.g., P or B slice), the prediction mode type of the current block may be reset to the above-described call input value (that is, the prediction mode type of S2110) of the coding_unit syntax.

In another example, the prediction mode type of the current block may be reset to a predetermined prediction mode type (e.g., MODE_TYPE_INTRA) based on the slice type of the current block and the size of the current block. For example, in the case where the slice type of the current block is an I slice and at least one of the width or height of the current block is greater than 64, the prediction mode type of the current block may be reset to MODE_TYPE_INTRA. In contrast, in the case where the slice type of the current block is not an I slice (e.g., P or B slice) or both the width and height of the current block are less than or equal to 64, the prediction mode type of the current block may be reset to the above-described call input value (that is, the prediction mode type of S2110) of the coding_unit syntax.

The image decoding apparatus may obtain the prediction mode information of the current block based on the prediction mode type reset according to the above-described method (S2130). For example, the image decoding apparatus may obtain the prediction mode information of the current block, by parsing the coding_unit syntax included in a bitstream based on the reset prediction mode type. Here, the prediction mode information of the current block may include cu_skip_flag specifying whether the skip mode is applied, pred_mode_flag specifying whether the intra prediction mode or the inter prediction mode is applied, pred_mode_ibc_flag specifying whether IBC is applied, and pred_mode_plt_flag specifying whether the palette mode is applied. Details of the above-described prediction mode information was described above with reference to FIGS. 14 to 19.

The image decoding apparatus may generate the prediction block of the current block based on the prediction mode information of the current block (S2140). Specifically, the image decoding apparatus may determine the prediction mode of the current block based on the prediction mode information of the current block. In addition, the image decoding apparatus may generate the prediction block of the current block, by performing prediction based on the determined prediction mode.

As described above, according to the image decoding method of an embodiment of the present disclosure, the prediction mode type of the current block may be reset to a predetermined prediction mode type (e.g., MODE_TYPE_INTRA) based on at least one of the slice type or size of the current block. In addition, the prediction mode information of the current block may be obtained based on the reset prediction mode type. Therefore, the parsing condition of the prediction mode information may be simplified and, for the current block for which the inter prediction mode and/or IBC may not be applied, cu_skip_flag may be inferred as a first value (e.g., 0) without being decoded.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 22:
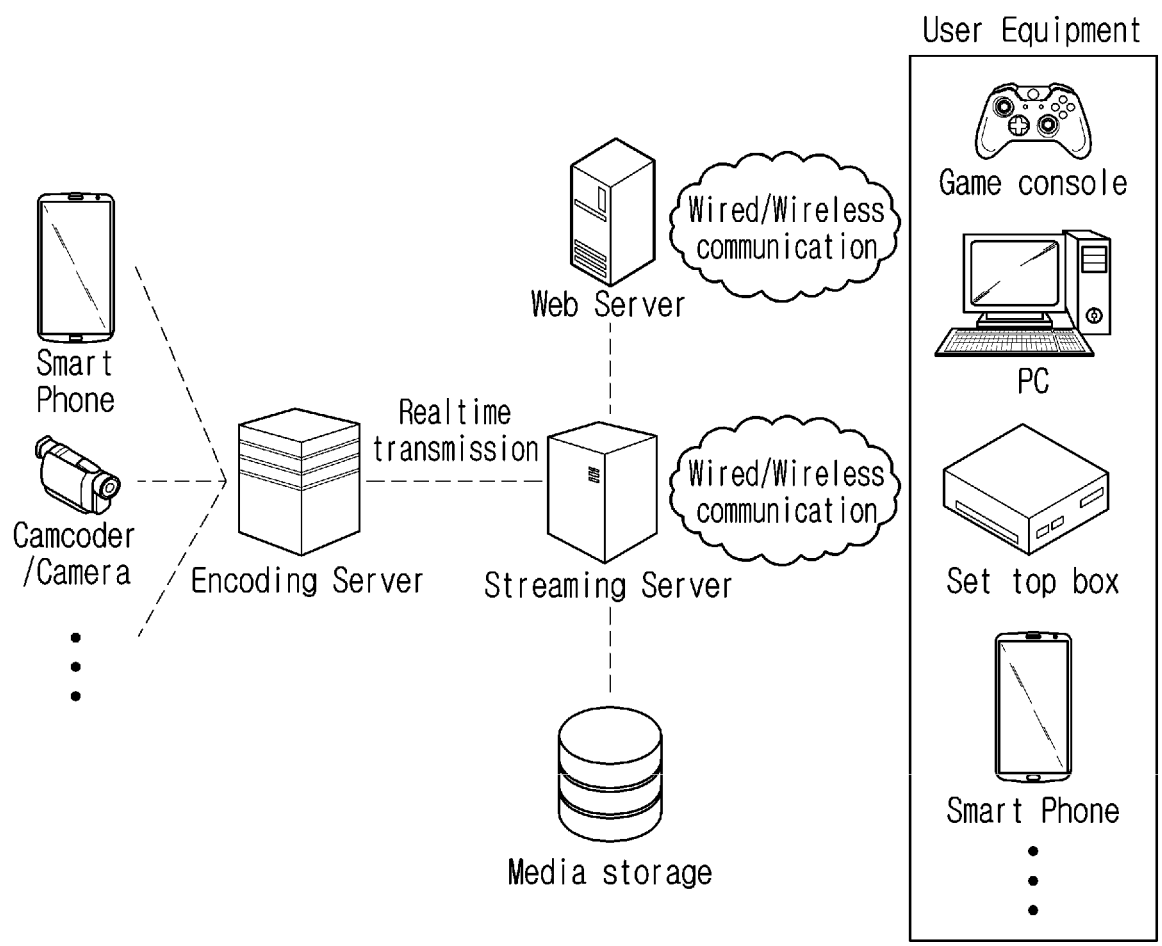
FIG. 22 is a view showing a content streaming system, to which an embodiment of the present disclosure is applicable.

FIG. 22 is a view showing a contents streaming system, to which an embodiment of the present disclosure is applicable.

As shown in FIG. 22, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
    obtaining a current block corresponding to a leaf node of a split tree structure based on a predetermined prediction mode type;
    determining a prediction mode type of the current block as either an intra type MODE_TYPE_INTRA or the predetermined prediction mode type;
    obtaining prediction mode information of the current block based on the determined prediction mode type; and
    generating a prediction block of the current block based on the obtained prediction mode information,
    wherein the determination of the prediction mode type of the current block is performed based on a slice type and size of the current block.

2. The image decoding method of claim 1, wherein, based on the slice type of the current block being an I slice and at least one of a width or height of the current block being greater than 64, the prediction mode type of the current block is determined as the intra type MODE_TYPE_INTRA.

3. The image decoding method of claim 1, wherein, based on the slice type of the current block being a P or B slice, the prediction mode type of the current block is determined as the predetermined prediction mode type.

4. The image decoding method of claim 1, wherein, based on a width and height of the current block being less than or equal to 64, the prediction mode type of the current block is determined as the predetermined prediction mode type.

5. The image decoding method of claim 1, wherein, based on the determined prediction mode type being the intra type MODE_TYPE_INTRA, the prediction mode information does not comprise information on a skip mode.

6. The image decoding method of claim 5, wherein the information on the skip mode is inferred as a first value specifying that the skip mode is not applied for the current block.

7. The image decoding method of claim 1, wherein the predetermined prediction mode type is determined based on prediction mode characteristic information of a higher-layer block of the current block.

8. The image decoding method of claim 1, wherein the current block is obtained by determining a split structure based on the predetermined prediction mode type and splitting a higher-layer block of the current block based on the determined split structure.

9. The image decoding method of claim 8, wherein, based on the predetermined prediction mode type being the intra type MODE_TYPE_INTRA, the split structure is determined to be a dual tree structure.

10. The image decoding method of claim 8, wherein, based on the predetermined prediction mode type being not the intra type MODE_TYPE_INTRA, the split structure is determined to be the same structure as the split structure of the higher-layer block.

11. An image encoding method performed by an image encoding apparatus, the image encoding method comprising:
    obtaining a current block corresponding to a leaf node of a split tree structure based on a predetermined prediction mode type;
    determining a prediction mode type of the current block as either an intra type MODE_TYPE_INTRA or the predetermined prediction mode type; and
    encoding prediction mode information of the current block based on the determined prediction mode type,
    wherein the determination of the prediction mode type of the current block is performed based on a slice type and size of the current block.

12. The image encoding method of claim 11, wherein, based on the slice type of the current block being an I slice and at least one of a width or height of the current block being greater than 64, the prediction mode type of the current block is determined as the intra type MODE_TYPE_INTRA.

13. The image encoding method of claim 11, wherein, based on the determined prediction mode type being the intra type MODE_TYPE_INTRA, the prediction mode information does not comprise information on a skip mode.

14. A non-transitory computer-readable recording medium storing a bitstream generated by an image encoding method, the image encoding method comprising:
    obtaining a current block corresponding to a leaf node of a split tree structure based on a predetermined prediction mode type;
    determining a prediction mode type of the current block as either an intra type MODE_TYPE_INTRA or the predetermined prediction mode type; and
    encoding prediction mode information of the current block based on the determined prediction mode type,
    wherein the determination of the prediction mode type of the current block is performed based on a slice type and size of the current block.

15. A method of transmitting a bitstream generated by an image encoding method, the image encoding method comprising:
    obtaining a current block corresponding to a leaf node of a split tree structure based on a predetermined prediction mode type;
    determining a prediction mode type of the current block as either an intra type MODE_TYPE_INTRA or the predetermined prediction mode type; and
    encoding prediction mode information of the current block based on the determined prediction mode type,
    wherein the determination of the prediction mode type of the current block is performed based on a slice type and size of the current block.

* * * * *